United States Patent
Naessens et al.

(10) Patent No.: US 12,544,349 B1
(45) Date of Patent: Feb. 10, 2026

(54) COMPOSITIONS COMPRISING PEMVIDUTIDE AND AN ACYLATED AMINO ACID

(71) Applicant: ADOCIA, Lyons (FR)

(72) Inventors: Ulysse Naessens, Curis au Mont d'Or (FR); Romain Noel, Villeurbanne (FR)

(73) Assignee: ADOCIA, Lyons (FR)

( * ) Notice: Subject to any disclaimer, the term of this patent is extended or adjusted under 35 U.S.C. 154(b) by 0 days.

(21) Appl. No.: 19/005,623

(22) Filed: Dec. 30, 2024

(51) Int. Cl.
*A61K 31/198* (2006.01)
*A61K 9/48* (2006.01)
*A61K 38/26* (2006.01)
*A61K 38/56* (2006.01)

(52) U.S. Cl.
CPC .............. *A61K 31/198* (2013.01); *A61K 9/48* (2013.01); *A61K 38/26* (2013.01); *A61K 38/56* (2013.01)

(58) Field of Classification Search
CPC ........ A61K 31/198; A61K 9/48; A61K 38/26; A61K 38/56
See application file for complete search history.

(56) References Cited

U.S. PATENT DOCUMENTS

| | | | |
|---|---|---|---|
| 12,172,946 B2 * | 12/2024 | Liang | ............... C07C 237/22 |
| 2014/0056953 A1 | 2/2014 | Foeger et al. | |
| 2015/0265710 A1 | 9/2015 | Hubalek et al. | |
| 2025/0000948 A1 | 1/2025 | Laurent et al. | |

FOREIGN PATENT DOCUMENTS

| | | | | |
|---|---|---|---|---|
| EP | 3 006 045 A1 | 4/2016 | | |
| EP | 4299071 A1 * | 1/2024 | ............ | C07K 14/605 |
| WO | WO-2023084118 A1 * | 5/2023 | ............ | A61K 47/183 |
| WO | WO-2024003400 A1 * | 1/2024 | ............ | C07K 14/605 |
| WO | 2014/060472 A1 | 4/2024 | | |

OTHER PUBLICATIONS

Choudhary, Chunaram, et al. "Lysine acetylation targets protein complexes and co-regulates major cellular functions." Science 325.5942 (2009): 834-840. (Year: 2009).*
Marín-Peñalver, Juan José, et al. "Update on the treatment of type 2 diabetes mellitus." World journal of diabetes 7.17 (2016): 354. (Year: 2016).*
Sawai, Monali V., et al. "Impact of single-residue mutations on the structure and function of ovispirin/novispirin antimicrobial peptides." Protein engineering 15.3 (2002): 225-232. (Year: 2002).*
Bolognesi, Benedetta, et al. "Single point mutations induce a switch in the molecular mechanism of the aggregation of the Alzheimer's disease associated Aβ42 peptide." ACS Chemical Biology 9.2 (2014): 378-382. (Year: 2013).*
D.J. Brayden, et al., Systemic delivery of peptides by the oral route: Formulation and medicinal chemistry approaches, Advanced Drug Delivery Reviews (2020)157:2-36.
Gregory Burshtein, et al., The combined effect of permeation enhancement and proteolysis inhibition on the systemic exposure of orally administrated peptides: Salcaprozate sodium, soybean trypsin inhibitor, and teriparatide study in pigs, International Journal of Pharmaceutics: X (2021)3:100097.
(a) Applicant's co-pending U.S. Appl. No. 18/879,641, which is the National Phase entry under 35 USC 371 of PCT/EP2023/068122 filed Jun. 30, 2023 (published as WO2024/003400), and (b) the Preliminary Amendment filed in U.S. Appl. No. 18/879,641 amending the claims.
Preliminary Amendment filed in U.S. Appl. No. 18/879,641 on Jun. 30, 2023 amending the claims.

* cited by examiner

*Primary Examiner* — Jeanette M Lieb
*Assistant Examiner* — David Paul Bowles
(74) *Attorney, Agent, or Firm* — Duane Morris LLP; Thomas J. Kowalski

(57) ABSTRACT

The invention relates to a pharmaceutical composition, in particular a solid composition, including a compound of (i), which is a permeation enhancer according to Formula I, said permeation enhancer being an acylated aminoacid substituted on the amine function, also called AC-aa-NS, and a compound of (ii) having at least 90% sequence identity to SEQ ID NOS: 1-23. Also disclosed are methods of preparing the pharmaceutical composition, formulations, and their use in medicine.

30 Claims, No Drawings
Specification includes a Sequence Listing.

COMPOSITIONS COMPRISING PEMVIDUTIDE AND AN ACYLATED AMINO ACID

RELATED APPLICATIONS AND INCORPORATION BY REFERENCE

Reference is made to international patent application Serial No. PCT/EP2023/068122, filed Jun. 30, 2023, which was published as WO 2024/003400 on Jan. 4, 2024, which claims benefit of European patent application Serial No. 22305988.2, filed Jul. 1, 2022.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

SEQUENCE LISTING

The instant application contains a Sequence Listing which has been submitted via Patent Center and is hereby incorporated by reference in its entirety. Said .xml copy, created on Dec. 30, 2024 is named Y9151-00010.xml, and is 39,311 bytes in size.

FIELD OF THE INVENTION

The present invention concerns relates to permeation enhancers for enhancing bioavailability of drugs and therapeutics. In some embodiments, the present invention relates to a composition comprising the permeation enhancer, wherein said permeation enhancer can comprise an acylated aminoacid substituted on the amine function, also called AC-aa-NS. Also contemplated are methods of preparation and applications in medicine.

BACKGROUND OF THE INVENTION

Current peptides or protein therapies rely on the parenteral administration.

Although oral delivery provides numerous advantages such as comfort of administration, improved compliance to the treatment, ease of ingestion, and avoidance of pain, there are numerous hurdles facing oral administration of peptides and proteins.

Among these hurdles include a low bioavailability, a great variability of the bioavailability, a difficult processability, a slow solubilization of the permeation enhancer and/or an absorption site which can be aggressive for the active principle.

The peptides or proteins which are marketed under oral form are mostly small cyclic non-acylated or non-pegylated peptides. By small is meant a molecular weight of less or equal to 1200 Da. There we can cite Cyclosporin, Octreotide and Desmopressin.

However with respect to peptides or proteins not falling into this class, we can only cite Rybelsus® as marketed peptide product which is a long acting GLP-1 RA (semaglutide) combined with a permeation enhancer (SNAC) in order to allow the oral delivery.

Although this product is marketed it still has some drawbacks, such as a low bioavailability, a great variability of bioavailability between different administrations, a slow solubilization of the permeation enhancer and also a constraint regarding the dosage protocol (fasting at least 30 minutes after Rybelsus® dosage).

Citation or identification of any document in this application is not an admission that such document is available as prior art to the present invention.

SUMMARY OF THE INVENTION

The invention proposes a way to solve at least part of the above cited problems.

In particular the invention aims at:
improving the bioavailability and/or
having a very short window of absorption and/or
decreasing the variability of bioavailability between administrations.

Decreasing the variability of bioavailability between administrations would permit the use of short acting APIs as a great variability of absorption for short acting APIs would lead to great variability of API concentration in the blood, and thus the risk that the patient has a too low or too large dose of API.

This is surprisingly that the applicant has found that a composition according to the invention solves at least one of the technical problems cited above.

This is also surprisingly that the applicant has found that a solid composition, in particular in an oral dosage form comprising the composition according to the invention, solves at least one of the technical problems cited above.

Moreover the applicant found an unexpected property of acylated aminoacid AC-aa-NS, or a salt thereof, as these compounds are protease inhibitors.

According to a first aspect of the present invention, the present invention relates to a pharmaceutical composition comprising:
(i) a compound AC-aa-NS comprising an acetylated amino acid, wherein AC-aa-NS has the following general Formula I:

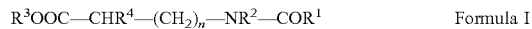

$$R^3OOC-CHR^4-(CH_2)_n-NR^2-COR^1 \quad \text{Formula I}$$

wherein:
n is an integer having a value of 0, 1, 2, 3, 4 or 5;
$R^1$ is an alkyl comprising 5 to 15 carbon atoms, an alkyl comprising 7 to 17 carbon atoms and a carboxyl group, or an alkyl comprising 7 to 17 carbon atoms and a hydroxyl group;
$R^2$ is an alkyl comprising 2 to 8 carbon atoms or comprises $-(CH_2)_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by an alkyl comprising 1 to 3 carbon atoms, a methoxy group, or a halogen;
$R^4$ is an α-carbon side chain of an amino acid, said amino acid comprising Glycine (Gly), Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), Proline (Pro), Serine (Ser), Threonine (Thr), Cysteine (Cys), Tyrosine (Tyr), Asparagine (Asn), Glutamine (Gln), Aspartic acid (Asp), Glutamic acid (Glu), hydroxyproline (Hyp), phosphoserine, alpha-aminoisobutyric acid (Aib), alpha-aminobutyric acid (Abu), or tert-butyl-glycine;

or $R^2$ and $R^4$ together form —$(CH_2)_o$—Ar—$(CH_2)_p$—, wherein —$(CH_2)_o$— bonds to $R^2$ and —$(CH_2)_p$— bonds to $R^4$, o has a value of 0 or 1, p has a value of 0, 1 or 2, the sum of o and p being 1 or 2, and Ar comprising a phenyl group or an indole group;

wherein a first ring carbon atom of Ar bonds to —$(CH_2)_o$— and a second ring carbon of Ar, which is adjacent to the first carbon ring atom, bonds to —$(CH_2)_p$—; and $R^3$ is hydrogen or a cation;

and (ii) a compound having at least 90% sequence identity to:

(SEQ ID NO: 1)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(17-carboxyl-heptadecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 2)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-$Lys_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 3)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-tetradecyl alpha-D-melibiouronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 4)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-hexadecyl alpha-D-melibiouronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 5)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-octadecyl alpha-D-melibiouronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 6)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-dodecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-dodecyl beta-D-glucuronyl))$_{24}$-$Trp_{25}$-$Leu_{26}$-$Leu_{27}$-$Gln_{28}$-$Thr_{29}$-$NH_2$;

(SEQ ID NO: 7)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-tetradecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-tetradecyl beta-D-glucuronyl))$_{24}$-$Trp_{25}$-$Leu_{26}$-$Leu_{27}$-$Gln_{28}$-$Thr_{29}$-$NH_2$;

(SEQ ID NO: 8)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-hexadecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-hexadecyl beta-D-glucuronyl))$_{24}$-$Trp_{25}$-$Leu_{26}$-$Leu_{27}$-$Gln_{28}$-$Thr_{29}$-$NH_2$;

(SEQ ID NO: 9)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(13-carboxyl-tridecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 10)
$His_1$-$Aib_2$-$Gln_3$-$Gly_4$-$Thr_5$-$Phe_6$-$Thr_7$-$Sers$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(15-carboxyl-pentadecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 11)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln17Ala$_{18}$-Ala$_{19}$-Lys$_{20}$Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 12)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 13)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(17-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 14)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(13-carboxyl-tridecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 15)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(15-carboxyl-pentadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 16)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(17-carboxyl-heptadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 17)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 18)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 19)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(17-carboxyl-heptadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 20)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 21)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 22)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$; or

-continued (SEQ ID NO: 23)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

and
a pharmaceutically acceptable carrier or excipient.

In some embodiments, n is 0.

In some embodiments, $R^1$ is a linear or branched alkyl group

In some embodiments, $R^1$ is a linear alkyl group comprising 7 carbon atoms

In some embodiments, the carboxyl group is a carboxyl group of a carboxylic acid, acid anhydride, or ester.

In some embodiments, the carboxyl group is a terminal carboxyl group.

In some embodiments, the hydroxyl group is a terminal hydroxyl group.

In some embodiments, $R^2$ is an alkyl comprising 2 to 8 carbon atoms.

In some embodiments, $R^2$ is —(CH$_2$)$_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by alkyl comprising 1 to 3 carbon atoms, a methoxy group, or a halogen.

In some embodiments, m is 1.

In some embodiments, Aro comprises an unsubstituted phenyl group.

In some embodiments, $R^4$ comprises the α-carbon side chain of Glycine (Gly).

In some embodiments, n is 4.

In some embodiments, $R^2$ and $R^4$ together form —(CH$_2$)$_o$—Ar—(CH$_2$)$_p$—.

In some embodiments, one of o or p is 1 and the other is 0. In some embodiments, o and p are each 1.

In some embodiments, Ar comprises a phenyl group. In some embodiments, Ar comprises an indole group.

In some embodiments, $R^3$ is hydrogen.

In some embodiments, $R^3$ is an alkali metal cation. In some embodiments, the alkali metal cation is a lithium, sodium, or potassium cation.

In some embodiments, the compound of (i) comprises a structure of:

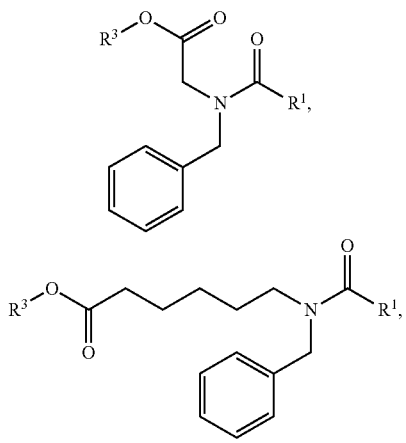

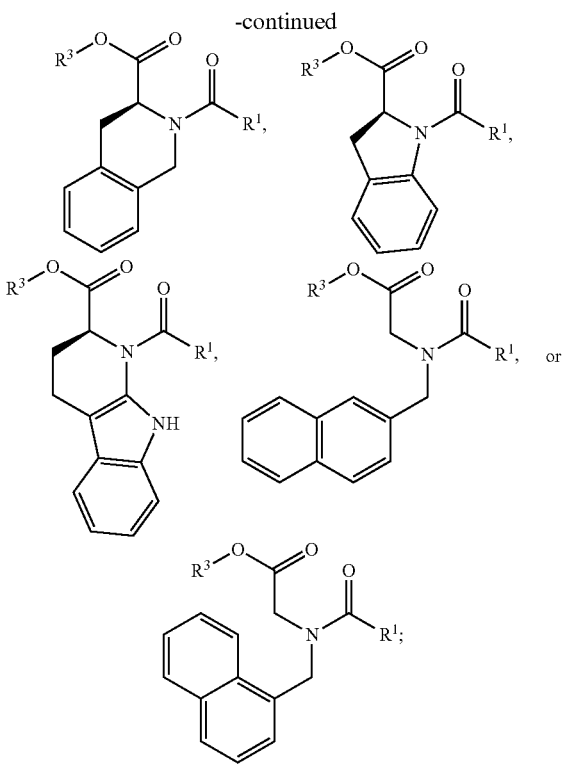

wherein $R^1$ and $R^3$ are as described herein.

In some embodiments, the compound of (i) is NaGly(N-Bn)C8 having the structure:

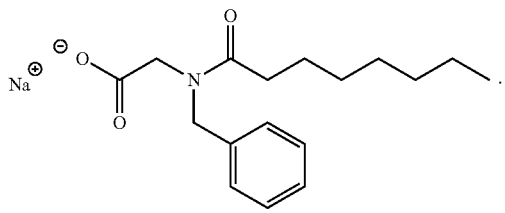 [SMILES: [Na+] ; CCCCCCCC(=O)N(CC(=O)[O-])Cc1ccccc1]

In some embodiments, the compound of (ii) comprises pemvidutide.

In some embodiments, the compound of (ii) has at least 90% sequence identity to SEQ ID NO: 1 or SEQ ID NO: 2.

In some embodiments, the compound has at least 95% sequence identity to SEQ ID NO: 1 or SEQ ID NO: 2. In some embodiments, the compound has at least 99% sequence identity to SEQ ID NO: 1 or SEQ ID NO: 2.

In some embodiments, the pharmaceutical composition comprises about 0.5 to about 20 wt % of the compound of (ii).

In some embodiments, the pharmaceutical composition comprises at least 300 mg/g of the compound of (i) relative to the total weight of the composition.

In some embodiments, the weight ratio of the compound of (i) to the compound of (ii) is from about 1:1 to about 200:1.

In some embodiments, the pharmaceutical composition comprises an excipient, wherein the a lubricant, surfactant, pH modifier, disintegrant, binders, filler, glidant, diluent, polymer for sustained or delayed release, or a preservative.

In some embodiments, the pharmaceutical composition comprises a pH modifier, wherein the pH modifier comprises sodium carbonate, phosphates, citrates, citric acid, tartarate or tartaric acid.

In some embodiments, the pH modifier comprises sodium carbonate.

In some embodiments, the pharmaceutical composition comprises at most 15% w/w of the pH modifier.

In some embodiments, the pharmaceutical composition comprises a lubricant, wherein the lubricant comprises magnesium stearate or glyceryl dibehenate.

In some embodiments, the pharmaceutical composition comprises less than 5% w/w of the lubricant.

In some embodiments, the pharmaceutical composition comprises a disintegrant, wherein the disintegrant comprises croscarmellose.

In some embodiments, the pharmaceutical composition comprises about 25 and about 2.5% w/w of the disintegrant.

In some embodiments, the pharmaceutical composition further comprises a serine protease inhibitor.

In some embodiments, the serine protease inhibitor comprises Aprotinin, Bacitracin, Lima bean trypsin inhibitor, Ovomucoid, Soybean trypsin inhibitor (SBTI), KTI (Kunitz Trypsine Inhibitor), BBI (Bowman-Birk Inhibitor), SFTI (SunFlower Trypsin Inhibitor), or mixtures thereof.

In some embodiments, the serine protease inhibitor comprises SBTI.

In some embodiments, the pharmaceutical composition comprises 100 to 400 mg/g of the serine protease inhibitor.

In some embodiments, the pharmaceutical composition further comprises a permeation enhancer.

In some embodiments, the permeation enhancer comprises sodium salcaprozate.

In some embodiments, the pharmaceutical composition at least 300 mg/g of the permeation enhancer.

In some embodiments, the pharmaceutical composition comprises the compound of (ii), NaGly(N-Bn)C8, sodium carbonate, and SBTI.

In some embodiments, the pharmaceutical composition is an oral composition.

In some embodiments, the pharmaceutical composition is a solid composition.

In some embodiments, the solid composition is a unitary solid dosage.

In some embodiments, the unitary solid dosage comprises the compound of (ii) and NaGly(N-Bn)C8.

In some embodiments, the unitary solid dosage is in the form of capsules, tablets, dragees, pills, lozenges, powders, or granules.

According to another aspect of the present invention, the present invention relates to a method for treating obesity, type II diabetes, or non alcoholic steatohepatitis comprising administering to a subject, the pharmaceutical composition as described herein.

In some embodiments, the administering step comprises orally administering the pharmaceutical composition as described herein.

In some embodiments, the method comprises administering to the subject the pharmaceutical composition comprising the compound of (ii) and NaGly(N-Bn)C8. In some embodiments, the pharmaceutical composition further comprises SBTI.

In some embodiments, the administering step occurs once daily. In some embodiments, the administering step occurs twice daily. In some embodiments, the administering step occurs weekly. In some embodiments, the administering step occurs monthly.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112(a)) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

DETAILED DESCRIPTION OF THE INVENTION

Unless otherwise specified, the below terms used herein are defined as follows:

The term "AC-aa-NS" refers to the acetylated amino acid having the structure of Formula I as described herein.

The terms "halo," "halogen," and "halide" are used interchangeably and refer to fluorine, chlorine, bromine, and iodine.

The term "alkyl" refers to and includes both straight and branched chain alkyl groups having an alkyl carbon atom bonded to the relevant structure. Preferred alkyl groups are those containing from one to fifteen carbon atoms, preferably one to nine carbon atoms, and includes methyl, ethyl, propyl, 1-methylethyl, butyl, 1-methylpropyl, 2-methylpropyl, pentyl, 1-methylbutyl, 2-methylbutyl, 3-methylbutyl, 1,1-dimethylpropyl, 1,2-dimethylpropyl, 2,2-dimethylpropyl, and the like. Additionally, the alkyl group can be further substituted.

The term "heterocyclic group" refers to and includes aromatic and non-aromatic cyclic groups containing at least one heteroatom. Optionally the at least one heteroatom is selected from O, S, Se, N, P, B, Si, Ge, and Se, preferably, O, S, N, or B. Hetero-aromatic cyclic groups may be used interchangeably with heteroaryl. Preferred hetero-non-aromatic cyclic groups are those containing 3 to 10 ring atoms, preferably those containing 3 to 7 ring atoms, which includes at least one hetero atom, and includes cyclic amines such as morpholino, piperidino, pyrrolidino, and the like, and cyclic ethers/thio-ethers, such as tetrahydrofuran, tetrahydropyran, tetrahydrothiophene, and the like. Additionally, the heterocyclic group can be further substituted or fused.

The term "aryl" refers to and includes both single-ring and polycyclic aromatic hydrocarbyl groups. The polycyclic rings may have two or more rings in which two carbons are common to two adjoining rings (the rings are "fused"). Preferred aryl groups are those containing six to thirty carbon atoms, preferably six to twenty-four carbon atoms, six to eighteen carbon atoms, and more preferably six to twelve carbon atoms. Especially preferred is an aryl group having six carbons, ten carbons, twelve carbons, fourteen carbons, or eighteen carbons. Suitable aryl groups include phenyl, biphenyl, triphenyl, triphenylene, tetraphenylene, naphthalene, anthracene, phenalene, phenanthrene, pyrene, chrysene, perylene, and azulene, preferably phenyl, biphenyl, triphenyl, triphenylene, and naphthalene. Additionally, the aryl group can be further substituted or fused, such as, without limitation, fluorene.

The term "heteroaryl" refers to and includes both single-ring aromatic groups and polycyclic aromatic ring systems that include at least one heteroatom. The heteroatoms include, but are not limited to O, S, Se, N, P, B, Si, Ge, and Se. In many instances, O, S, N, or B are the preferred heteroatoms. Hetero-single ring aromatic systems are preferably single rings with 5 or 6 ring atoms, and the ring can have from one to six heteroatoms. The hetero-polycyclic ring systems can have two or more aromatic rings in which two atoms are common to two adjoining rings (the rings are "fused") wherein at least one of the rings is a heteroaryl. The hetero-polycyclic aromatic ring systems can have from one to six heteroatoms per ring of the polycyclic aromatic ring system. Preferred heteroaryl groups are those containing three to thirty carbon atoms, preferably three to twenty-four carbon atoms, three to eighteen carbon atoms, and more preferably three to twelve carbon atoms. Suitable heteroaryl groups include dibenzothiophene, dibenzofuran, dibenzoselenophene, furan, thiophene, benzofuran, benzothiophene, benzoselenophene, carbazole, indolocarbazole, pyridylindole, pyrrolodipyridine, pyrazole, imidazole, triazole, oxazole, thiazole, oxadiazole, oxatriazole, dioxazole, thiadiazole, pyridine, pyridazine, pyrimidine, pyrazine, triazine, oxazine, oxathiazine, oxadiazine, indole, benzimidazole, indazole, indoxazine, benzoxazole, benzisoxazole, benzothiazole, quinoline, isoquinoline, cinnoline, quinazoline, quinoxaline, naphthyridine, phthalazine, pteridine, xanthene, acridine, phenazine, phenothiazine, phenoxazine, benzofuropyridine, furodipyridine, benzothienopyridine, thienodipyridine, benzoselenophenopyridine, selenophenodipyridine, azaborine, borazine, and 5,9-dioxa-13b-boranaphtho[3,2,1-de]anthracene. Advantageously, the heteroaryl can comprise dibenzothiophene, dibenzofuran, dibenzoselenophene, carbazole, indolocarbazole, imidazole, pyridine, triazine, benzimidazole, and 5,9-dioxa-13b-boranaphtho[3,2,1-de]anthracene. Additionally, the heteroaryl group can be further substituted or fused.

Of the aryl and heteroaryl groups listed above, the groups of triphenylene, naphthalene, anthracene, dibenzothiophene, dibenzofuran, dibenzoselenophene, carbazole, indolocarbazole, imidazole, pyridine, pyrazine, pyrimidine, triazine, benzimidazole, 5,9-dioxa-13b-boranaphtho[3,2,1-de]anthracene, and the respective aza-analogs of each thereof are of particular interest.

The terms "substituted" and "substitution" refer to a substituent other than H that is bonded to the relevant position, e.g., a carbon or nitrogen. For example, when $R^4$ represents mono-substitution, then one $R^4$ must be other than H (i.e., a substitution). Similarly, when $R^4$ represents di-substitution, then two of $R^4$ must be other than H. Similarly, when $R^4$ represents zero or no substitution, $R^4$, for example, can be a hydrogen for all available valencies of ring atoms, as in carbon atoms for benzene and the nitrogen atom in pyrrole, or simply represents nothing for ring atoms with fully filled valencies, e.g., the nitrogen atom in pyridine. The maximum number of substitutions possible in a ring structure will depend on the total number of available valencies in the ring atoms.

As used herein, "combinations thereof" or "mixtures thereof" indicates that one or more members of the applicable list are combined. In one instance, the term includes a combination of two to four of the listed groups. In another instance, the term includes a combination of two to three groups.

As used herein, "adjacent" means that the two substituents involved can be on the same ring next to each other, or on two neighboring rings having the two closest available substitutable positions, such as 2, 2' positions in a biphenyl, or 1, 8 position in a naphthalene.

The percentage of sequence identity may be determined by optimal alignment of the two protein/peptide sequences a and b and is defined as PID=(number of identical amino acid positions)/(the total length of the alignment, i.e. the longer sequence length of the sequences a and b including gaps) in %. The sequence alignment is performed using CLUSTALW software with the standard parameters: gap open penalty of 10, gap extension penalty of 0.1 and BLOSUM weight matrix.

The present invention relates to a pharmaceutical composition comprising:
(i) a compound AC-aa-NS having the following general Formula I:

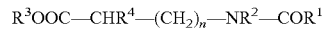

$$R^3OOC-CHR^4-(CH_2)_n-NR^2-COR^1$$

wherein:
n is an integer having a value of 0, 1, 2, 3, 4 or 5;
$R^1$ is an alkyl comprising 5 to 15 carbon atoms, an alkyl comprising 7 to 17 carbon atoms and a carboxyl group, or an alkyl comprising 7 to 17 carbon atoms and a hydroxyl group;
$R^2$ is an alkyl comprising 2 to 8 carbon atoms or comprises —(CH$_2$)$_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by an alkyl comprising 1 to 3 carbon atoms, a methoxy group, or a halogen;
$R^4$ is an α-carbon side chain of an amino acid, said amino acid comprising Glycine (Gly), Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), Proline (Pro), Serine (Ser), Threonine (Thr), Cysteine (Cys), Tyrosine (Tyr), Asparagine (Asn), Glutamine (Gln), Aspartic acid (Asp), Glutamic acid (Glu), hydroxyproline (Hyp), phosphoserine, alpha-aminoisobutyric acid (Aib), alpha-aminobutyric acid (Abu), or tert-butyl-glycine;

or $R^2$ and $R^4$ together form $-(CH_2)_o-Ar-(CH_2)_p-$, wherein $-(CH_2)_o-$ bonds to $R^2$ and $-(CH_2)_p$-bonds to $R^4$, o has a value of 0 or 1, p has a value of 0, 1 or 2, the sum of o and p being 1 or 2, and Ar comprising a phenyl group or an indole group;

wherein a first ring carbon atom of Ar bonds to $-(CH_2)_o-$ and a second ring carbon of Ar, which is adjacent to the first carbon ring atom, bonds to $-(CH_2)_p-$; and $R^3$ is hydrogen or a cation;

and (ii) a compound having at least 90% sequence identity to:

(SEQ ID NO: 1)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(17-carboxyl-heptadecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 2)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-$Lys_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 3)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-tetradecyl alpha-D-melibiouronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 4)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-hexadecyl alpha-D-melibiouronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 5)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-octadecyl alpha-D-melibiouronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 6)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-dodecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-dodecyl beta-D-glucouronyl))$_{24}$-$Trp_{25}$-$Leu_{26}$-$Leu_{27}$-$Gln_{28}$-$Thr_{29}$-$NH_2$;

(SEQ ID NO: 7)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-tetradecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-tetradecyl beta-D-glucouronyl))$_{24}$-$Trp_{25}$-$Leu_{26}$-$Leu_{27}$-$Gln_{28}$-$Thr_{29}$-$NH_2$;

(SEQ ID NO: 8)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-hexadecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-hexadecyl beta-D-glucouronyl))$_{24}$-$Trp_{25}$-$Leu_{26}$-$Leu_{27}$-$Gln_{28}$-$Thr_{29}$-$NH_2$;

(SEQ ID NO: 9)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(13-carboxyl-tridecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 10)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(15-carboxyl-pentadecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 11)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln17Ala$_{18}$-Ala$_{19}$-Lys$_{20}$Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 12)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 13)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(17-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 14)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(13-carboxyl-tridecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 15)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(15-carboxyl-pentadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 16)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(17-carboxyl-heptadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 17)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 18)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 19)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(17-carboxyl-heptadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 20)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 21)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 22)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$; or (SEQ ID NO: 23)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

and a pharmaceutically acceptable carrier or excipient.

In some embodiments, $R^1$ is a linear alkyl group.

In some embodiments, $R^1$ is a branched alkyl group.

In some embodiments, $R^1$ is an alkyl comprising 5, 6, 7, 8, 9, 10 11, 12, 13, 14, or 15 carbon atoms.

In some embodiments, $R^1$ is an alkyl comprising 5 to 10 carbon atoms. In some embodiments, $R^1$ is an alkyl comprising 7 to 11 carbon atoms. In some embodiments, $R^1$ is an alkyl comprising 12 to 15 carbon atoms.

In some embodiments, $R^1$ is an alkyl comprising 7, 8, 9, 10, 11, 12, 13, 14, 15, 16, or 17 carbon atoms and a carboxyl group. In some embodiments, the carboxyl group is a terminal carboxyl group.

In some embodiments, $R^1$ is a branched alkyl comprising 7 to 17 carbon atoms and a carboxyl group, wherein the carboxyl group is a terminal carboxyl group. In some embodiments, $R^1$ is a branched alkyl comprising 7 to 12 carbon atoms and a carboxyl group, wherein the carboxyl group is a terminal carboxyl group. In some embodiments, $R^1$ is a branched alkyl comprising 13 to 17 carbon atoms and a carboxyl group, wherein the carboxyl group is a terminal carboxyl group.

In some embodiments, the carboxyl group is a carboxyl group of a carboxylic acid, acid anhydride, or ester.

In some embodiments, $R^1$ is an alkyl comprising 7, 8, 9, 10, 11, 12, 13, 14, 15, 16, or 17 carbon atoms and a hydroxyl group. In some embodiments, the hydroxyl group is a terminal hydroxyl group.

In some embodiments, $R^1$ is a branched alkyl comprising 7 to 17 carbon atoms and a hydroxyl group, wherein the hydroxyl group is a terminal hydroxyl group. In some embodiments, $R^1$ is a branched alkyl comprising 7 to 12 carbon atoms and a hydroxyl group, wherein the hydroxyl group is a terminal hydroxyl group. In some embodiments, $R^1$ is a branched alkyl comprising 13 to 17 carbon atoms and a hydroxyl group, wherein the carboxyl group is a terminal hydroxyl group.

In some embodiments, $R^2$ is an alkyl comprising 2 to 4 carbon atoms. In an advantageous embodiment, $R^2$ is a linear alkyl.

In some embodiments, $R^2$ is an alkyl comprising 2, 3, 4, 5, 6, 7, or 8 carbon atoms. In some embodiments, $R^2$ is an alkyl comprising 5 to 8 carbon atoms. In an advantageous embodiment, $R^2$ is a linear alkyl.

In some embodiments, $R^2$ is —(CH$_2$)$_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by alkyl comprising 1 to 3 carbon atoms, a methoxy group, or a halogen. In an advantageous embodiment, Aro is unsubstituted phenyl.

According to an embodiment, $R^2$ is —(CH$_2$)$_m$-Aro, wherein m is an integer having a value from 1 to 4, Aro comprises naphtyl, anthracyl, indole, or pyridinyl, wherein Aro is optionally substituted by alkyl comprising from 1 to 3 carbon atoms, a methoxy group, or a halogen. In some embodiments, Aro is unsubstituted naphtyl, anthracyl, indole or pyridinyl.

In some embodiments, $R^4$ comprises an α-carbon side chain of an amino acid, said amino acid comprising Glycine (Gly), Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), Proline (Pro), Serine (Ser), Threonine (Thr), Cysteine (Cys), Tyrosine (Tyr), Asparagine (Asn), Glutamine (Gln), Aspartic acid (Asp), Glutamic acid (Glu), hydroxyproline (Hyp), phosphoserine, alpha-aminoisobutyric acid (Aib), alpha-aminobutyric acid (Abu), or tert-butyl-glycine In some embodiments, the side chain is the α-carbon side chain of the amino acids Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), Proline (Pro) and Sarcosine (Sarc).

In some embodiments, the side chain is the α-carbon side chain of the amino acids Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), and Proline (Pro).

1 In some embodiments, the side chain is the α-carbon side chain of the amino acids Phenylalanine (Phe), N-methyl Phenylalanine (NMePhe), pipecolinic acid, Phenylglycine (PGly), Tryptophane (Trp) and Proline (Pro).

In some embodiments, the side chain is the α-carbon side chain of the amino acids In some embodiments, the side chain is the α-carbon side chain of the amino acids Serine (Ser), Threonine (Thr), Cysteine (Cys), Tyrosine (Tyr), Asparagine (Asn), and Glutamine (Gln).

In some embodiments, the side chain is the α-carbon side chain of the amino acids Phenylalanine (Phe), N-methyl Phenylalanine (NMePhe), Phenylglycine (PGly), Tryptophane (Trp) and Tyrosine (Tyr).

In some embodiments, the side chain is the α-carbon side chain of the amino acids Alanine (Ala), Valine (Val), Leucine (Leu) and Isoleucine (Ile).

In some embodiments, the side chain is the α-carbon side chain of the amino acid Glycine (Gly).

In some embodiments, the amino acid can be the L-stereoisomer, the D-stereoisomer, or a mixture of enantiomers.

In some embodiments, $R^4$ comprises —H, —CH$_3$, —CH$_2$CH(CH$_3$)$_2$, —CH(CH$_3$)CH$_2$CH$_3$, —CH$_2$-Ph (-Ph is —C$_6$H$_5$), -Ph, —CH$_2$-Ph-OH (Tyrosine side chain), —CH$_2$—Indole (-Indole is C$_8$H$_6$N, Tryptophan side chain), —CH$_2$CH$_2$SCH$_3$, —CH$_2$OH, —CH$_2$SH, —CH$_2$CONH$_2$, —CH$_2$CH$_2$CONH$_2$, —CH$_2$COOH, —CH$_2$CH$_2$COOH, and their salts.

In some embodiments, $R^4$ comprises —H, —CH$_3$, —CH$_2$CH(CH$_3$)$_2$, —CH(CH$_3$)CH$_2$CH$_3$, —CH$_2$-Ph, or -Ph.

In some embodiments, $R^3$ is hydrogen.

In some embodiments, $R^3$ is a cation. In some embodiments, $R^3$ is an alkali metal cation. In some embodiments, the alkali metal cation is a lithium, sodium, or potassium cation.

In some embodiments, the compound of (i) has the following Formula Ia:

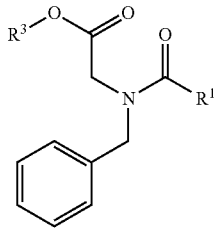

Formula Ia wherein R¹ and R³ are as described herein.

In some embodiments, the compound has the following Formula Ib:

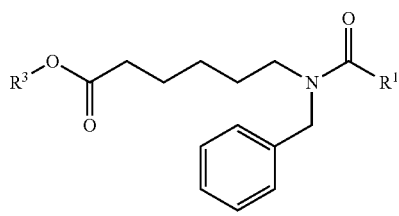

Formula Ib wherein R¹ and R³ are as described herein.

In some embodiments, the compound has the following Formula Ic:

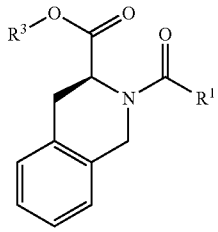

Formula Ic wherein R¹ and R³ are as described herein.

In some embodiments, the compound has the following Formula Id:

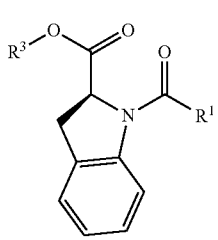

Formula Id wherein R¹ and R³ are as described herein.

In some embodiments, the compound has the following Formula Ie:

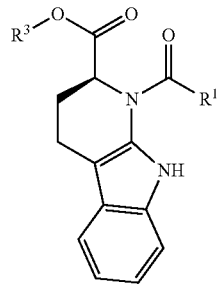

Formula Ie wherein R¹ and R³ are as described herein.

In some embodiments, the compound has the following Formula If:

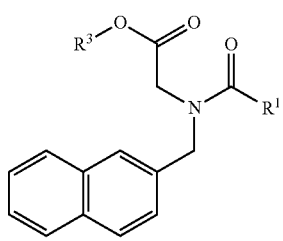

Formula If wherein R¹ and R³ are as described herein.

In some embodiments, the compound has the following Formula Ig:

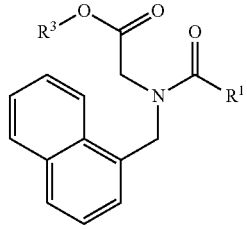

Formula Ig wherein R¹ and R³ are as described herein.

In some embodiments, the compound comprises the formula of any one of Formulas Ia, Ib, Ic, Id, Je, If, or Ig, wherein R³ is H or Na. In some embodiments, R³ is H. In some embodiments, R³ is Na.

In some embodiments, the compound comprises the formula of any one of Formulas Ia, Tb, Ic, Id, Ie, If, or Ig, wherein R¹ is an alkyl comprising from 6 to 9 Carbon atoms. In some embodiments, R¹ is an alkyl comprising 7 or 8 carbon atoms.

In some embodiments, n=0 or 1. In some embodiments, n=0. In some embodiments, n=1.

In some embodiments, n=2, 3, 4 or 5. In some embodiments, n=2. In some embodiments, n=3. In some embodiments, n=4. In some embodiments, n=5.

In some embodiments, the compound has the structure according to Formula I wherein:
R¹ is an alkyl comprising 5 to 15 carbon atoms,
R² is —(CH$_2$)$_m$-Aro, wherein m is an integer having a value from 1 to 4, and Aro comprises phenyl.

In some embodiments, the compound has the structure according to Formula I wherein:
$R^1$ is an alkyl comprising 6 to 9 carbon atoms,
$R^2$ is —$(CH_2)_m$-Aro, with m being 1 to 4, and Aro being phenyl.

In some embodiments, the compound has the structure according to Formula I wherein:
$R^1$ is an alkyl comprising 7 to 8 carbon atoms,
$R^2$ is —$(CH_2)_m$-Aro, with m being 1 to 4, and Aro being phenyl.

In some embodiments, the compound has the structure according to Formula I wherein:
$R^1$ is an alkyl comprising 7 to 17 carbon atoms and bearing a carboxylate function,
$R^2$ is —$(CH_2)_m$-Aro, with m being 1 to 4, and Aro being phenyl.

In some embodiments, AC-aa-NC is according to Formula I wherein
$R^1$ is an alkyl comprising 7 to 11 carbon atoms and bearing a carboxylate function,
$R^2$ is —$(CH_2)_m$-Aro, with m being 1 to 4, and Aro being phenyl.

In some embodiments, the compound has the structure according to Formula I wherein:
$R^1$ is an alkyl comprising 7 to 17 carbon atoms and bearing a alcohol function,
$R^2$ is —$(CH_2)_m$-Aro, with m being 1 to 4, and Aro being phenyl.

In some embodiments, the compound has the structure according to Formula I wherein:
$R^1$ is an alkyl comprising 7 to 11 carbon atoms and bearing a alcohol function,
$R^2$ is —$(CH_2)_m$-Aro, with m being 1 to 4, and Aro being phenyl.

In some embodiments, the compound of (i) is NaGly(N-Bn)C8 having the structure:

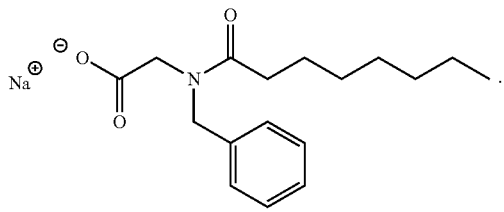 [SMILES: [Na+] ; CCCCCCCC(=O)N(CC(=O)[O-])Cc1ccccc1]

The pharmaceutical composition further comprises the compound of (ii). The compound of (ii) can comprise pemvidutide or a compound having at least 90% sequence identity to one of the following compounds:

(SEQ ID NO: 1)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(17-carboxyl-heptadecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 2)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 3)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-tetradecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 4)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-hexadecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 5)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-octadecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 6)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-dodecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-dodecyl beta-D-glucuronyl))$_{24}$-Trp$_{25}$-Leu$_{26}$-Leu$_{27}$-Gln$_{28}$-Thr$_{29}$-NH$_2$;

(SEQ ID NO: 7)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-tetradecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-tetradecyl beta-D-glucuronyl))$_{24}$-Trp$_{25}$-Leu$_{26}$-Leu$_{27}$-Gln$_{28}$-Thr$_{29}$-NH$_2$;

-continued (SEQ ID NO: 8)
$His_1$-$Aib_2$-$Gln_3$-$Gly_4$-$Thr_5$-$Phe_6$-$Thr_7$-$Sers_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-hexadecyl alpha-D-melibiouronyl))$_{17}$-$Ala_{18}$-$Ala_{19}$-$Lys_{20}$-$Glu_{21}$-$Phe_{22}$-$Ile_{23}$-Lys(N-omega(1-hexadecyl beta-D-glucouronyl))$_{24}$-$Trp_{25}$-$Leu_{26}$-$Leu_{27}$-$Gln_{28}$-$Thr_{29}$-$NH_2$;

(SEQ ID NO: 9)
$His_1$-$Aib_2$-$Gln_3$-$Gly_4$-$Thr_5$-$Phe_6$-$Thr_7$-$Sers_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(13-carboxyl-tridecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 10)
$His_1$-$Aib_2$-$Gln_3$-$Gly_4$-$Thr_5$-$Phe_6$-$Thr_7$-$Sers_8$-$Asp_9$-$Tyr_{10}$-$Ser_{11}$-$Lys_{12}$-$Tyr_{13}$-$Leu_{14}$-$Asp_{15}$-$Glu_{16}$-Lys(N-omega(1-(15-carboxyl-pentadecyloxy)beta-D-glucuronyl))$_{17}$-$Ala_{18}$-$Ala_{19}$-$Lys_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 11)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-Gln17$Ala_{18}$-$Ala_{19}$-$Lys_{20}$$Glu_{21}$-$Phe_{22}$-$Ile_{23}$-Lys(N-omega(1-(13-carboxyl-tridecyloxy)beta-D-glucuronyl))$_{24}$-$Trp_{25}$-$Leu_{26}$-$Leu_{27}$-$Gln_{28}$-$Thr_{29}$-$NH_2$;

(SEQ ID NO: 12)
$His_1$-$Aib_2$-$Gln_3$-$Gly_4$-$Thr_5$-$Phe_6$-$Thr_7$-$Ser_8$-$Asp_9$-$Tyr_{10}$-$Ser_{11}$-$Lys_{12}$-$Tyr_{13}$-$Leu_{14}$-$Asp_{15}$-$Glu_{16}$-$Gln_{17}$-$Ala_{18}$-$Ala_{19}$-$Lys_{20}$-$Glu_{21}$-$Phe_{22}$-$Ile_{23}$-Lys(N-omega(1-(15-carboxyl-pentadecyloxy)beta-D-glucuronyl))$_{24}$-$Trp_{25}$-$Leu_{26}$-$Leu_{27}$-$Gln_{28}$-$Thr_{29}$-$NH_2$;

(SEQ ID NO: 13)
$His_1$-$Aib_2$-$Gln_3$-$Gly_4$-$Thr_5$-$Phe_6$-$Thr_7$-$Sers_8$-$Asp_9$-$Tyr_{10}$-$Ser_{11}$-$Lys_{12}$-$Tyr_{13}$-$Leu_{14}$-$Asp_{15}$-$Glu_{16}$-$Gln_{17}$-$Ala_{18}$-$Ala_{19}$-$Lys_{20}$-$Glu_{21}$-$Phe_{22}$-$Ile_{23}$-Lys(N-omega(1-(17-carboxyl-pentadecyloxy)beta-D-glucuronyl))$_{24}$-$Trp_{25}$-$Leu_{26}$-$Leu_{27}$-$Gln_{28}$-$Thr_{29}$-$NH_2$;

(SEQ ID NO: 14)
$His_1$-$Aib_2$-$Gln_3$-$Gly_4$-$Thr_5$-$Phe_6$-$Thr_7$-$Ser_8$-$Asp_9$-$Glu_{10}$-$Ser_{11}$-$Lys_{12}$-$Tyr_{13}$-$Lys_{14}$-$Asp_{15}$-$Ser_{16}$-Lys(N-omega(1-(13-carboxyl-tridecyloxy)beta-D-glucuronyl))$_{17}$-$Ala_{18}$-$Ala_{19}$-$Gln_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 15)
$His_1$-$Aib_2$-$Gln_3$-$Gly_4$-$Thr_5$-$Phe_6$-$Thr_7$-$Sers_8$-$Asp_9$-$Glu_{10}$-$Ser_{11}$-$Lys_{12}$-$Tyr_{13}$-$Lys_{14}$-$Asp_{15}$-$Ser_{16}$-Lys(N-omega(1-(15-carboxyl-pentadecyloxy)beta-D-glucuronyl))$_{17}$-$Ala_{18}$-$Ala_{19}$-$Gln_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 16)
$His_1$-$Aib_2$-$Gln_3$-$Gly_4$-$Thr_5$-$Phe_6$-$Thr_7$-$Ser_8$-$Asp_9$-$Glu_{10}$-$Ser_{11}$-$Lys_{12}$-$Tyr_{13}$-$Lys_{14}$-$Asp_{15}$-$Ser_{16}$-Lys(N-omega(1-(17-carboxyl-heptadecyloxy)beta-D-glucuronyl))$_{17}$-$Ala_{18}$-$Ala_{19}$-$Gln_{20}$-$Glu_{21}$-$Phe_{22}$-$Ile_{23}$-$Gln_{24}$-$Trp_{25}$-$Leu_{26}$-$Leu_{27}$-$Gln_{28}$-$Thr_{29}$-$NH_2$;

(SEQ ID NO: 17)
$His_1$-$Aib_2$-$Gln_3$-$Gly_4$-$Thr_5$-$Phe_6$-$Thr_7$-$Ser_8$-$Asp_9$-$Glu_{10}$-$Ser_{11}$-$Lys_{12}$-$Tyr_{13}$-$Lys_{14}$-$Asp_{15}$-$Ser_{16}$-$Gln_{17}$-$Ala_{18}$-$Ala_{19}$-$Gln_{20}$-$Glu_{21}$-$Phe_{22}$-$Ile_{23}$-Lys(N-omega(1-(13-carboxyl-tridecyloxy)beta-D-glucuronyl))$_{24}$-$Trp_{25}$-$Leu_{26}$-$Leu_{27}$-$Gln_{28}$-$Thr_{29}$-$NH_2$;

(SEQ ID NO: 18)
$His_1$-$Aib_2$-$Gln_3$-$Gly_4$-$Thr_5$-$Phe_6$-$Thr_7$-$Sers_8$-$Asp_9$-$Glu_{10}$-$Ser_{11}$-$Lys_{12}$-$Tyr_{13}$-$Lys_{14}$-$Asp_{15}$-$Ser_{16}$-$Gln_{17}$-$Ala_{18}$-$Ala_{19}$-$Gln_{20}$-$Glu_{21}$-$Phe_{22}$-$Ile_{23}$-Lys(N-omega(1-(15-carboxyl-pentadecyloxy)beta-D-glucuronyl))$_{24}$-$Trp_{25}$-$Leu_{26}$-$Leu_{27}$-$Gln_{28}$-$Thr_{29}$-$NH_2$;

(SEQ ID NO: 19)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-
Ala$_{18}$-Ala$_{19}$-Gln$_{20}$-Glu$_{21}$-Phe$_{22}$-Ile$_{23}$-Lys(N-omega(1-(17-carboxyl-heptadecyloxy)beta-D-
glucuronyl))$_{24}$-Trp$_{25}$-Leu$_{26}$-Leu$_{27}$-Gln$_{28}$-Thr$_{29}$-NH$_2$;

(SEQ ID NO: 20)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-
Lys$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 21)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-
Gln$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 22)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys$_{17}$-
Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$; or (SEQ ID NO: 23)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-
Ala$_{18}$-Ala$_{19}$-Gln$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

In some embodiments, the compound of (ii) can comprise a compound having at least 90% sequence identity to those compounds disclosed or claimed in U.S. Pat. Nos. 9,856,306 and 10,577,405, EP3155017B1, and WO 2024/003400A1.

In an advantageous embodiment, the compound of (ii) can comprise pemvidutide. Pemvidutide is a peptide-based GLP-1/glucagon dual receptor agonist. Activation of the GLP-1 and glucagon receptors can mimic the effects of diet and exercise in contemplation of weight loss in which GLP-1 suppresses appetite and glucagon increases energy expenditure and has an effect on hepatic fat metabolism.

Advantageously, pemvidutide and its derivatives can comprise a surfactant comprising a hydrophobic domain (e.g., substituted or unsubstituted alkyl chain) and a hydrophilic group (e.g., saccharide) conjugated to a non-terminal amino acid of the peptide as described in, for example, U.S. Pat. Nos. 9,856,306 and 10,577,405, and EP3155017B1, whose contents are incorporated by reference herein in their entireties. This domain allows the peptide to bind extensively to albumin, an abundant protein in the blood, slowing the elimination of the peptide and increasing its serum half-life, allowing for increased spacing between dosings (e.g., weekly dosing instead of daily dosing). This domain can also slow the entry of the peptide in circulation, decreasing the $C_{max}$ (maximal concentration), increasing the $T_{max}$ (time to maximal concentration) of the peptide, and can improve the tolerability of the peptide, thereby preventing increases in heart rate that have been observed with other agents.

In some embodiments, pemvidutide has the sequence His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{16}$-Lys(N-omega(1-(17-carboxyl-heptadecyloxy)beta-D-glucuronyl))$_{17}$-Ala$_{18}$-Ala$_{19}$-Lys*$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$ (SEQ ID NO: 1), which comprises the hydrophobic domain and hydrophilic group conjugated to the non-terminal amino acid of the peptide or His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu*$_{16}$-Lys$_{17}$-Ala$_{18}$-Ala$_{19}$-Lys*$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$ (SEQ ID NO: 2), which lacks said surfactant.

In some embodiments, pemvidutide can comprise the sequence His$_1$-aa$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-aa$_{16}$-aa$_{17}$-Ala$_{18}$-Ala$_{19}$-aa$_{20}$-Glu$_{21}$-Phe$_{22}$-aa$_{23}$-aa$_{24}$-Trp$_{25}$-Leu$_{26}$-aa$_{27}$-aa$_{28}$-Thr$_{29}$-NH$_2$ (SEQ ID NO. 24),
wherein:
aa$_2$ is Aib;
aa$_{16}$ is Glu;
aa$_{17}$ is Lys;
aa$_{20}$ is Lys;
aa$_{23}$ is Ile;
aa$_{24}$ is Gln;
aa$_{27}$ is Leu; and
aa$_{28}$ is Gln.

In some embodiments, the compound of (ii) has at least 90% sequence identity to SEQ ID NO: 24. In some embodiments, the compound of (ii) comprises at least 90%, 91%, 92%, 93%, 94%, 95%, 96%, 97%, 98%, or 99% sequence identity to SEQ ID NO: 24.

In some embodiments, the pharmaceutical composition comprises the compound of (ii) having at least 90% sequence identity to SEQ ID NOS: 1-23. In some embodiments, the pharmaceutical composition comprises the compound of (ii) having at least 90%, 91%, 92%, 93%, 94%, 95%, 96%, 97%, 98%, or 99% sequence identity to SEQ ID NOS: 1-23.

In an advantageous embodiment of the present invention, the present invention relates to a pharmaceutical composition comprising: (i) a compound AC-aa-NS comprising an acetylated amino acid AC-aa-NS having the following general Formula I:

$$R^3OOC—CHR^4—(CH)_n—NR^2—COR^1 \qquad \text{Formula I}$$

wherein:
n is an integer having a value of 0, 1, 2, 3, 4 or 5;
R$^1$ is an alkyl comprising 5 to 15 carbon atoms, an alkyl comprising 7 to 17 carbon atoms and a carboxyl group, or an alkyl comprising 7 to 17 carbon atoms and a hydroxyl group;
R$^2$ is an alkyl comprising 2 to 8 carbon atoms or comprises —(CH$_2$)$_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by an alkyl comprising 1 to 3 carbon atoms, a methoxy group, or a halogen;

$R^4$ is an α-carbon side chain of an amino acid, said amino acid comprising Glycine (Gly), Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), Proline (Pro), Serine (Ser), Threonine (Thr), Cysteine (Cys), Tyrosine (Tyr), Asparagine (Asn), Glutamine (Gln), Aspartic acid (Asp), Glutamic acid (Glu), hydroxyproline (Hyp), phosphoserine, alpha-aminoisobutyric acid (Aib), alpha-aminobutyric acid (Abu), or tert-butyl-glycine;

or $R^2$ and $R^4$ together form $-(CH_2)_o-Ar-(CH_2)_p-$, wherein $-(CH_2)_o-$ bonds to $R^2$ and $-(CH_2)_p$-bonds to $R^4$, o has a value of 0 or 1, p has a value of 0, 1 or 2, the sum of o and p being 1 or 2, and Ar comprising a phenyl group or an indole group;

wherein a first ring carbon atom of Ar bonds to $-(CH_2)_o-$ and a second ring carbon of Ar, which is adjacent to the first carbon ring atom, bonds to $-(CH_2)_p-$; and $R^3$ is hydrogen or a cation;

and (ii) a compound having at least 90% sequence identity to His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu*$_{16}$-Lys(N-omega(1-(17-carboxyl-heptadecyloxy)beta-D-glucuronyl))$_{17}$-Ala$_{18}$-Ala$_{19}$-Lys*$_{20}$-Glu$_{21}$-Phe$_{22}$-Ile$_{23}$-Gn$_{24}$-Trp$_{25}$-Leu$_{26}$-Leu$_{27}$-Gln$_{28}$-Thr$_{29}$-NH$_2$ (SEQ ID NO: 1) or His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu*$_{16}$-Lys$_{17}$-Ala$_{18}$-Ala$_{19}$-Lys*$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$ (SEQ ID NO: 2); and a pharmaceutically acceptable carrier or excipient.

In some embodiments, the pharmaceutical composition comprises pemvidutide, which has the sequence His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu*$_{16}$-Lys(N-omega(1-(17-carboxyl-heptadecyloxy)beta-D-glucuronyl))$_{17}$-Ala$_{18}$-Ala$_{19}$-Lys*$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$ (SEQ ID NO: 1) or His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu*$_{16}$-Lys$_{17}$-Ala$_{18}$-Ala$_{19}$-Lys*$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$(SEQ ID NO: 2).

In some embodiments, the pharmaceutical composition comprises the compound of (ii) having at least 90% sequence identity to SEQ ID NO: 1 or SEQ ID NO: 2. In some embodiments, the pharmaceutical composition comprises the compound of (ii) having at least 90%, 91%, 92%, 93%, 94%, 95%, 96%, 97%, 98%, or 99% sequence identity to SEQ ID NO: 1 or SEQ ID NO: 2.

In some embodiments, the composition comprises from about 0.25 to about 20 wt %, about 0.5 to about 20 wt %, about 1 to about 20 wt %, about 2 to about 20 wt %, or about 5 to about 20 wt % of the compound of (ii).

In some embodiments, AC-aa-NS has a critical micellar concentration in solution in water in Fasted State Simulated Intestinal Fluid (FaSSIF) buffer (Biorelevant, London, UK) (sodium taurochlolate, soy lethicin) at pH 6.5 and 25° C., also called CMC, of at least 1 mM.

The CMC is determined by surface tension measurement of aqueous solutions.

In some embodiments, the AC-aa-NS has a CMC of at least 2.5 mM, at least 5 mM, at least 10 mM, at least 15 mM, at least 20 mM, at least 25 mM, or at least 30 mM. In some embodiments, the AC-aa-NS has a CMC of at most 200 mM.

In some embodiments, the AC-aa-NS has a CMC in the range of about 5 to about 50 mM. In some embodiments, the AC-aa-NS has a CMC in the range of about 10 to about 30 mM.

In some embodiments, the compound AC-aa-NS is a permeation enhancer.

In some embodiments, the composition comprises at least 300 mg/g, at least 400 mg/g, at least 500 mg/g, at least 600 mg/g, at least 700 mg/g, at least 800 mg/g, or at least 900 mg/g, of AC-aa-NS relative to the total weight of the composition.

In some embodiments, the composition comprises at most 980 mg/g, at most 900 mg/g, or at most 800 mg/g of AC-aa-NS relative to the total weight of the composition.

In some embodiments, the protease inhibitor is NaGly(N-Bn)C8.

In some embodiments, the weight ratio of the compound of (i) to the compound of (ii) is from about 1:1 to about 200:1, about 1:1 to about 100:1, about 1:1 to about 50:1, about 1:1 to about 40:1, about 1:1 to about 30:1, or from about 1:1 to about 20:1.

In some embodiments, the composition comprises a pharmaceutically acceptable carrier. In some embodiments, the pharmaceutically acceptable carrier may be a solvent or dispersing medium containing, for example, water, ethanol, polyol (for example, glycerol, propylene glycol, liquid polyethylene glycol, and the like), suitable mixtures thereof, and vegetable oils. In some embodiments, the pharmaceutically acceptable carrier is water.

In some embodiments, the composition comprises less than 10% w/w, less than 5% w/w, less than 2% w/w, or less than 1% w/w of water.

Additionally, various additives which enhance the stability, sterility, and isotonicity of the compositions, including antimicrobial preservatives, antioxidants, chelating agents, and buffers, may be added. Prevention of the action of microorganisms may be ensured by various antibacterial and antifungal agents, for example, parabens, chlorobutanol, sorbic acid, and the like. In many cases, it will be desirable to include isotonic agents, for example, sugars, sodium chloride, and the like. Prolonged absorption of the injectable pharmaceutical form may be brought about by the use of agents delaying absorption, for example, aluminum monostearate and gelatin.

In some embodiments, the pharmaceutical composition comprises an excipient. By "excipient" is meant a component of the composition which is not a permeation enhancer and protease inhibitor. In some embodiments, the excipient can comprise a lubricant, surfactant, pH modifier, disintegrant, binder, filler, glidant, diluent, polymer for sustained or delayed release (e.g. Eudragit polymers manufactured by Evonik) or a preservative.

In some embodiments, the excipient can comprise a lubricant, surfactant, pH modifier, disintegrant, binder, filler, glidant, diluent, or a preservative.

In some embodiments, the excipient can comprise a lubricant or pH modifier.

In some embodiments, at least one pH modifier. In some embodiments, the pH modifier comprises sodium carbonate (having the formula is $Na_2CO_3$), phosphates, citrates, citric acid, tartarate and tartaric acid.

Citrates can include, but are not limited to monosodium citrate, disodium citrate and/or trisodium citrate. In some embodiments, citrates can comprise trisodium citrate.

Tartarate can be monosodium and/or disodium tartarate. In some embodiments, the tartarate comprises monosodium tartarate.

In an advantageous embodiment, the pH modifier comprises sodium carbonate.

In some embodiments, the composition comprises at least 1% w/w, at least 2% w/w, or at least 5% w/w of the pH modifier.

In some embodiments, the composition comprises at most 15% w/w, at most 10% w/w of the pH modifier.

In some embodiments, the composition comprises at least one lubricant.

In some embodiments, the lubricant comprises magnesium stearate, glyceryl dibehenate, fumaric acid, stearic acid, calcium stearate, sodium stearyl fumarate, sucrose fatty acid ester, starch (wheat, rice, Corn or potato starch), talc, highly dispersed (colloidal) silica, magnesium oxide, magnesium carbonate, glyceryl behenate, glyceryl monostearate, silicon dioxide, calcium silicate, magnesium silicate, hardened vegetable oil, hard liquid paraffin, May be one or more selected from the group consisting of polyethylene glycol, sodium lauryl sulfate, magnesium lauryl sulfate, sodium benzoate, polyoxyethylene monostearate, glyceryl triacetate, or sucrose monolaurate, and mixtures thereof In an advantageous embodiment the lubricant comprises magnesium stearate or glyceryl dibehenate. In another advantageous embodiment, the lubricant comprises magnesium stearate. In yet another advantageous embodiment the lubricant comprises glyceryl dibehenate.

In some embodiments, the composition comprises more than or is equal to 0.1% w/w of the lubricant. In some embodiments, the composition comprises more than or is equal to 0.2% w/w of the lubricant. In some embodiments, the composition comprises more than or is equal to 0.5% w/w of the lubricant.

In some embodiment the composition comprises less than 5% w/w, less than 3% w/w, less than 2.5% w/w, less than 2% w/w, or less than 1% w/w of the lubricant.

In some embodiments, the composition comprises between about 0.25 and about 2.5% w/w of the lubricant.

In some embodiments, the composition comprises a disintegrant.

In some embodiments, the disintegrant comprises croscarmellose, carboxymethylcellulose, crospovidone, low-substituted hydroxypropylcellulose, starch, sodium carboxymethyl starch, sodium starch glyconate, alginic acid, carboxymethylcellulose sodium, agar, xylan, gellan gum, xanthan gum, or partially hydrolyzed starch, and mixtures thereof. In an advantageous embodiment, the disintegrant comprises croscarmellose.

In some embodiments, the composition comprises more than or is equal to 0.1% w/w of the disintegrant. In some embodiments, the composition comprises more than or is equal to 0.2% w/w of the disintegrant. In some embodiments, the composition comprises more than or is equal to 0.5% w/w of the disintegrant.

In some embodiment the composition comprises less than 5% w/w, less than 3% w/w, less than 2.5% w/w, less than 2% w/w, or less than 1% w/w of the disintegrant.

In some embodiments, the composition comprises between about 0.25 and about 2.5% w/w of the disintegrant.

In another embodiment, the composition can further comprise a binder (e.g. acacia, cornstarch, gelatin, carbomer, ethyl cellulose, guar gum, hydroxypropyl cellulose, hydroxypropyl methyl cellulose, povidone), disintegrating agents (e.g. cornstarch, potato starch, alginic acid, silicon dioxide, croscarmelose sodium, crospovidone, guar gum, sodium starch glycolate), buffers (e.g., Tris-HCl, acetate, phosphate) of various pH and ionic strength, additives such as albumin or gelatin to prevent absorption to surfaces, detergents (e.g., Tween 20, Tween 80, Pluronic F68, bile acid salts), surfactants (e.g. sodium lauryl sulfate), permeation enhancers, solubilizing agents (e.g., glycerol, polyethylene glycerol), anti-oxidants (e.g., ascorbic acid, sodium metabisulfite, butylated hydroxyanisole), stabilizers (e.g. hydroxypropyl cellulose, hyroxypropylmethyl cellulose), viscosity increasing agents (e.g. carbomer, colloidal silicon dioxide, ethyl cellulose, guar gum), sweeteners (e.g. aspartame, citric acid), preservatives (e.g., Thimerosal, benzyl alcohol, parabens), lubricants (e.g. stearic acid, magnesium stearate, polyethylene glycol, sodium lauryl sulfate), flow-aids (e.g. colloidal silicon dioxide), plasticizers (e.g. diethyl phthalate, triethyl citrate), emulsifiers (e.g. carbomer, hydroxypropyl cellulose, sodium lauryl sulfate), polymer coatings (e.g., poloxamers or poloxamines), coating and film forming agents (e.g. ethyl cellulose, acrylates, polymethacrylates).

In some embodiments, the composition comprises a protease inhibitor that is different from AC-aa-NS.

In some embodiments, the protease inhibitor that is different from AC-aa-NS comprises a serine protease inhibitor, a metalloprotease inhibitor, or mixtures thereof. In an advantageous embodiment, the composition comprises a serine protease inhibitor.

In some embodiments, the serine protease inhibitor can comprise protein, peptides, serpins, chemicals, or mixtures thereof as described in the following paragraphs.

In some embodiments, the serine protease inhibitor comprises a protein or a peptide comprising Aprotinin, Bacitracin, Lima bean trypsin inhibitor, Ovomucoid, Soybean trypsin inhibitor (SBTI), KTI (Kunitz Trypsine Inhibitor), BBI (Bowman-Birk Inhibitor), SFTI (SunFlower Trypsin Inhibitor), or mixtures thereof.

In some embodiments, the serine protease inhibitor comprises a serpin comprising Alpha-1-antitrypsin, Alpha 1-antichymotrypsin, alpha 2-macroglobulin, Antithrombin, Centerin, Kallistatin, Neuroserpin, Pancpin, Plasminogen activator inhibitor-2, Protein C inhibitor, Secretory leucocyte protease inhibitor, Squamous cell carcinoma antigen-1, Squamous cell carcinoma antigen-2, Ulinastatin, Vaspin, or mixtures thereof.

In some embodiments, the serine protease inhibitor can comprise a chemical comprising a AEBSF-hydrochloride (4-(2-aminoethyl)benzenesulfonyl fluoride), Aminobenzamidine dihydrochloride, epsilon-aminocaproic acid, APMSF-hydrochloride, benzamidine-hydrochloride, camostat mesylate, chymostatin, FK448, leupeptin, PEFABLOC SC, PMSF (Phenylmethylsulfonyl fluoride), TLCK (Nα-Tosyl-Lys-chloromethylketone), TPCK (6-(1-tosylamido-2-phenyl) ethyl chloromethyl ketone), or mixtures thereof.

In some embodiments, the composition comprises a serine protease inhibitor comprising SBTI, KTI, BBI, aprotinin, SFTI, ovomucoid, or mixtures thereof.

In some embodiments, the composition comprises a serine protease inhibitor comprising SBTI, KTI, BBI or mixtures thereof. In an advantageous embodiment, the serine protease inhibitor is or comprises SBTI.

According to an embodiment the composition comprises only one serine protease inhibitor.

According to an embodiment, the composition comprises SBTI.

According to an embodiment, the composition comprises KTI.

According to an embodiment, the composition comprises BBI.

According to an embodiment, the composition comprises SFTI.

According to an embodiment, the composition comprises as protease inhibitor at least 90% w/w or at least 95% w/w, SBTI.

According to an embodiment, the composition comprises as protease inhibitor at least 90% w/w or at least 95% w/w, KTI.

According to an embodiment, the composition comprises as protease inhibitor at least 90% w/w or at least 95% w/w, BBI.

According to an embodiment, the composition comprises as protease inhibitor at least 90% w/w or at least 95% w/w, BBI and KTI.

According to an embodiment, the composition comprises as protease inhibitor at least 90% w/w or at least 95% w/w, SFTI.

According to an embodiment, the composition comprises as protease inhibitor only SBTI.

According to an embodiment, the composition comprises as protease inhibitor only KTI.

According to an embodiment, the composition comprises as protease inhibitor only BBI.

According to an embodiment, the composition comprises as protease inhibitor only BBI and KTI.

According to an embodiment, the composition comprises as protease inhibitor only SFTI.

According to an embodiment the composition comprises a mixture of serine protease inhibitor.

According to an embodiment the composition comprises a mixture of serine protease inhibitor chosen from the group consisting of SBTI and aprotinin, KTI and aprotinin, BBI and aprotinin, SFTI and aprotinin, ovomucoid and aprotinin, SBTI and ovomucoid, KTI and ovomucoid, BBI and ovomucoid, SFTI and ovomucoid.

In some embodiments, the composition comprises a metalloprotease inhibitor.

In some embodiments, the metalloprotease inhibitor comprises CPB (Carboxypeptidase) Inhibitor from potato tuber, Angiotensin-1-converting enzyme inhibitory peptide, Antihemorragic factor BJ46a, Beta-casein, Proteinase inhibitor CeKI, Venom metalloproteinase inhibitor DM43, Carboxypeptidase A inhibitor, smpI, IMPI, Alkaline proteinase, inh, Latexin, Carboxypeptidase inhibitor, Antihemorragic factor HSF, Testican-3, SPOCK3, TIMP1, Metalloproteinase inhibitor 1, Metalloproteinase inhibitor 2, TIMP2, Metalloproteinase inhibitor 3, TIMP3, Metalloproteinase inhibitor 4, TIMP4, Putative metalloproteinase inhibitor tag-225, Tissue inhibitor of metalloprotease, WAP, kazal, immunoglobulin, or kunitz and NTR domain-containing protein 1.

In an advantageous embodiment, the metalloproteases inhibitor comprises CPB (Carboxypeptidase) Inhibitor from potato tuber.

In some embodiments, the composition comprises only one metalloprotease inhibitor.

In some embodiments, the composition comprises a mixture of metalloprotease inhibitors.

According to an embodiment the composition comprises a mixture of serine protease inhibitor and metalloprotease inhibitor.

According to an embodiment the composition comprises the mixture of serine protease inhibitor and metalloprotease inhibitor is chosen from the group consisting SBTI and CPB inhibitor, BBI and CPB inhibitor, KTI and CPB inhibitor aprotinin and CPB inhibitor, ovomucoid and CPB inhibitor.

According to an embodiment the composition comprises a mixture of serine protease inhibitor and metalloprotease inhibitor.

According to an embodiment the composition comprises the mixture of serine protease inhibitor and metalloprotease inhibitor is chosen from the group consisting of SBTI and sodium glycocholate, aprotinin and sodium glycocholate, ovomucoid and sodium glycocholate.

In some embodiments, the composition comprises from 10 to 500 mg, 10 to 200 mg, 10 to 150 mg, or 10 to 100 mg of protease inhibitor.

In some embodiments, the composition comprises from 20 to 600 mg/g, 20 to 400 mg/g, 20 to 250 mg/g, or 20 to 150 mg/g of protease inhibitor.

In some embodiments, the composition comprises SBTI, KTI, BBI and mixtures thereof. In an advantageous embodiment. In an advantageous embodiment, the composition comprises SBTI in an amount from 100 to 400 mg/g, 120 to 300 mg/g, 150 to 200 mg/g, 100 to 400 mg/g, 140 to 250 mg/g, or 150 to 200 mg/g.

In some embodiments, the composition comprises at least 500 mg/g, at least 600 mg/g, at least 700 mg/g, at least 800 mg/g, at least 900 mg/g, or at least 950 mg/g of permeation enhancers and of protease inhibitor, relative to the total weight of the composition. In an advantageous embodiment, the protease inhibitor is a Serine Protease inhibitor.

In some embodiments, the composition comprises at most 990 mg/g of permeation enhancers and of protease inhibitor, relative to the total weight of the composition. In an advantageous embodiment, the protease inhibitor is a Serine Protease inhibitor.

In some embodiments, the composition according to the present invention comprises at least one further permeation enhancer in addition to AC-aa-NS.

In some embodiments, the at least further permeation enhancer comprises a caprate, a caprylate, bile salts, salcaprozate, glycocholate, ursodeoxycholic acid, glycochenodeoxycholate, or glycodeoxycholate and their pharmaceutically acceptable salts, and mixtures thereof.

In an advantageous embodiment, the at least one further permeation enhancer comprises sodium caprate, sodium caprylate, or sodium salcaprozate (SNAC).

In some embodiments, the composition comprises a bile salt.

In some embodiments, the composition comprises only one bile salt.

In some embodiments, the composition comprises a mixture of bile salts.

In some embodiments, the bile salt comprises glycocholate, ursodeoxycholic acid, glycochenodeoxycholate, or glycodeoxycholate, and their pharmaceutically acceptable salts, and mixtures thereof.

In some embodiments, the bile salt comprises glycocholate. In an advantageous embodiment, the glycocholate comprises sodium glycocholate.

In some embodiments, the at least one further permeation enhancer comprises a caprate, a caprylate, bile salts, or salcaprozate, and mixtures thereof. In an advantageous embodiment, the at least one further permeation enhancer comprises sodium caprate, sodium carylate, or SNAC.

In some embodiments, the at least one further permeation enhancer comprises a caprate or a caprylate. In an advantageous embodiment, the at least one further permeation enhancer comprises sodium caprate or sodium caprylate In some embodiments, the at least one further permeation enhancer comprises a caprylate. In an advantageous embodiment, the at least one further permeation enhancer comprises sodium caprylate.

In some embodiments, the composition comprises at least 300 mg/g, at least 400 mg/g, at least 500 mg/g, at least 600 mg/g, at least 700 mg/g, at least 800 mg/g, or at least 900 mg/g of permeation enhancers relative to the total weight of the composition.

In some embodiments, the composition comprises at most 990 mg/g, at most 980 mg/g, at most 950 mg/g, at most 900 mg/g, or at most 800 mg/g of permeation enhancers relative to the total weight of the composition.

In some embodiments, the composition comprises a chelator of divalent cations.

In some embodiments, the chelator comprises a physiologically acceptable compound having a high affinity for at least one of calcium, magnesium, and manganese ions.

In some embodiments, the chelator comprises ethylenediamine tetracetic acid (EDTA) or a salt thereof (for example disodium EDTA and calcium disodium EDTA); EGTA (ethylene glycol tetraacetic acid) or a salt thereof; diethylene triamine pentaacetic acid (DTPA) or a salt thereof; BAPTA (1,2-bis(o-aminophenoxy)ethane-N,N,N',N'-tetraacetic acid) or a salt thereof; and mixtures thereof.

In some embodiments, the composition comprises exactly one chelator of divalent cations.

In some embodiments, the chelator is EDTA.

In some embodiments, the composition comprises 1 to 50% w/w, 2 to 30% w/w, or 5 to 25% w/w of the chelator of divalent cations. In an advantageous embodiment, the chelator of divalent cations is EDTA.

In some embodiments, the composition does not comprise Growth Hormone.

In a specific embodiment, the composition does not comprise growth hormones such as those described in WO2014060512.

In some embodiments, the composition does not comprise human Growth Hormone.

In some embodiments, the composition does not comprise insulin.

In some embodiments, the composition does not comprise long-acting insulin. In a specific embodiment, the composition does not comprise a long-acting insulin, for example, those described in WO2005012347, WO2009063072, and WO9507931.

In another specific embodiment, the composition does not comprise insulins such as, for example, those described in WO2012140155 and WO2014060447.

In some embodiments, the composition does not comprise an insulin comprising an acylated graft.

The pharmaceutical compositions of this invention may be administered orally, parenterally, by inhalation spray, topically, rectally, nasally, buccally, vaginally, or via an implanted reservoir. In an advantageous embodiment, the administration is oral administration. The pharmaceutical compositions of this invention may contain any conventional non-toxic pharmaceutically-acceptable carriers or vehicles. In some cases, the pH of the formulation may be adjusted with pharmaceutically acceptable acids, bases or buffers to enhance the stability of the formulated compound or its delivery form. The term parenteral as used herein includes subcutaneous, intracutaneous, intravenous, intramuscular, intra-articular, intrasynovial, intrasternal, intrathecal, intralesional, and intracranial injection or infusion techniques.

The pharmaceutical compositions may be in the form of a sterile injectable preparation, for example, as a sterile injectable aqueous or oleaginous suspension. This suspension may be formulated according to techniques known in the art using suitable dispersing or wetting agents (such as, for example, Tween 80) and suspending agents. The sterile injectable preparation may also be a sterile injectable solution or suspension in a non-toxic parenterally-acceptable diluent or solvent, for example, as a solution in 1,3-butanediol. Among the acceptable vehicles and solvents that may be employed are mannitol, water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, such as those described in Pharmacopeia Helvetica, or a similar alcohol.

The pharmaceutical compositions of this invention may be orally administered in any orally acceptable dosage form including, but not limited to, capsules, tablets, and aqueous suspensions and solutions. In the case of tablets for oral use, carriers which are commonly used include lactose and corn starch. Lubricating agents, such as magnesium stearate, are also typically added. For oral administration in a capsule form, useful diluents include lactose and dried corn starch. When aqueous suspensions and solutions and propylene glycol are administered orally, the active ingredient is combined with emulsifying and suspending agents. If desired, certain sweetening and/or flavoring and/or coloring agents may be added.

The pharmaceutical compositions of this invention may also be administered in the form of suppositories for rectal administration. These compositions can be prepared by mixing a compound of this invention with a suitable non-irritating excipient which is solid at room temperature but liquid at the rectal temperature and therefore melt in the rectum to release the active components. Such materials include, but are not limited to, cocoa butter, beeswax and polyethylene glycols.

According to another aspect of the present invention, in some embodiments, the pharmaceutical composition is a solid composition. In some embodiments, the solid composition comprises the compounds of (i) and (ii) and an excipient. In some embodiments, the excipient comprises a lubricant or a pH modifier.

In some embodiments, the solid composition comprises the compounds of (i) and (ii) and a lubricant.

In some embodiments, the solid composition comprises the compounds of (i) and (ii) and a pH modifier.

In some embodiments, the solid composition comprises at least 300 mg/g, at least 400 mg/g, at least 500 mg/g, at least 600 mg/g, at least 700 mg/g, at least 800 mg/g, or at least 900 mg/g of the compound of (i) relative to the total weight of the composition.

In some embodiments, the solid composition comprises at most 990 mg/g, at most 980 mg/g, at most 950 mg/g, at most 900 mg/g, or at most 800 mg/g of the compound of (i) relative to the total weight of the composition.

In some embodiments, the solid composition comprises a mixture of particles comprising the compound of (i) and particles comprising the compound of (ii). In an advantageous embodiment, the particles of the compound of (i) and the particles of the compound of (ii) are present in the composition in the ratio and percentages as described herein.

In some embodiments, the solid composition consists of a mixture of particles of the compound of (i) and particles of the compound of (ii). In an advantageous embodiment, the particles of the compound of (i) and particles of the compound of (ii) are present in the composition in the ratio and percentages as described herein.

In some embodiments, the solid composition comprises particles comprising a mixture of the compound of (i) and the compound of (ii). In an advantageous embodiment, the compound of (i) and the compound of (ii) are present in the ratios and percentages as described herein.

In some embodiments, the solid composition consists of particles that are a mixture of the compound of (i) and the compound of (ii). In an advantageous embodiment, each of the compound of (i) and the compound of (ii) are present in the ratios and percentages as described herein.

The particles comprising at the same time the compound of (i) and the compound of (ii) may be obtained via lyophilization, freeze drying, spray drying, wet granulation or dry granulation.

In some embodiments, the particles can comprise microgranules (5 mm-0.5 mm, exclusive of 0.5 mm), microparticules (0.5 mm-1 μm, exclusive of 1 μm) or nanoparticles (1000 nm-1 nm) and mixtures thereof.

Among manufacturing methods to reach these specific sizes the following methods can be cited wet granulation, dry granulation, spray-drying, milling, nanoprecipitation.

Following manufacture of the particles having a desired specific size, any method or instrumentation can be used to determine the mean diameters of the particles and the requisite resolution of the method or instrumentation will depend on the desired mean diameter of the particles. For example, these methods may include, but are not limited to laser granulometry, light obscuration, or electron microscopy.

In some embodiments, the particles comprise microgranules (number-averaged mean diameter 5 mm-0.5 mm) as measured by laser granulometry.

In some embodiments, the particles comprise microparticules (number-averaged mean diameter 0.5 mm-1 μm) as measured by light obscuration.

In some embodiments, the particles comprise nanoparticles (number-averaged mean diameter 1000 nm-1 nm) as measured by electron microscopy.

In some embodiments, the particles are free flowing.

In some embodiments, the particles are held or bonded together.

In some embodiments, the pharmaceutical composition of the invention can be in the form of a unitary solid dosage.

In some embodiments, the unitary solid dosage comprises the compound of (i) and the compound of (ii). In an advantageous embodiment, the unitary solid dosage comprises at least 50 mg or at least 300 mg of the compound of (i) and the compound of (ii).

In some embodiments, the unitary solid dosage is in the form of capsules, tablets, dragees, pills, lozenges, powders, or granules. In an advantageous embodiment, the unitary solid dosage is in the form of capsules, tablets, dragees, pills, lozenges, powders, or granules, and comprises at least 50 mg of the compound of (i).

In some embodiments, the unitary solid dosage is in the form of a capsule, wherein the capsule may contain powders, granules, or crushed tablets that of the compound of (ii) and one or more inert ingredients. In some embodiments, the capsules can be formulated with delayed release characteristics.

In some embodiments, the unitary solid dosage form is under the form of a hard capsule. In some embodiments, the unitary solid dosage form is under the form of a soft capsule.

According to another aspect of the present invention, in an advantageous embodiment, the pharmaceutical composition is an oral composition for oral delivery.

In an advantageous embodiment, the pharmaceutical composition that is an oral composition for oral delivery comprises the compound of (i) and the compound of (ii).

In some embodiments, the dosage forms of the present invention are formulated to achieve an immediate release profile, an extended release profile, or a delayed release profile. In some embodiments, the release profile of the composition is determined by using specific excipients that serve for example as binders, disintegrants, fillers, or coating materials. In one embodiment, the composition will be formulated to achieve a particular release profile as known to one skilled in the art.

In some embodiments, the oral composition is encapsulated or the like to allow the oral composition, which is swallowed, to be in contact with the gastro intestinal system.

In some embodiments, the encapsulation allows the oral composition to be delivered to the stomach. Advantageously, in some embodiments, the oral composition may be in the form of a film coated tablets with a thin layer of water soluble material that dissolves rapidly in the stomach.

In some embodiments, the oral composition further comprise a coating that inhibits digestion of the composition in the stomach of a subject. In one embodiment, coating inhibits digestion of the composition in the stomach of a subject. In one embodiment, the coated dosage forms of the present invention release drug when pH move towards alkaline range. In one embodiment, coating is a monolayer, wherein in other embodiments coating applied in multilayers. In one embodiment, coating is a bioadhesive polymer that selectively binds the intestinal mucosa and thus enables drug release in the attachment site. In one embodiment, the enteric coating is an enteric film coating. In some embodiment, coating comprises biodegradable polysaccharide, chitosan, aquateric aqueous, aquacoat ECD, azo polymer, cellulose acetate phthalate, cellulose acetate trimelliate, hydroxypropylmethyl cellulose phthalate, gelatin, polyvinyl acetate phthalate, hydrogel, pulsincap, or a combination thereof. In one embodiment, pH sensitive coating will be used according to the desired release site and/or profile as known to one skilled in the art.

In some embodiments, the encapsulation allows the composition to be delivered to the intestines. Advantageously, in some embodiments, the composition may be encapsulated with an enteric coating wherein the enteric coating may be in the form of a polymer coating or of a polymer capsule that controls disintegration and release of the composition.

As used herein, the term "enteric coating" means a coating that controls disintegration and release of an oral dosage form.

In some embodiments, the enteric coating can comprise soft technology. In some embodiments, the enteric coating utilizes soft capsule technology.

In some embodiments, the enteric coating can comprise hard technology. In some embodiments, the enteric coating utilizes hard capsule technology.

Methods for enteric coating are well known in the art, and are described, for example, in Siepmann F, Siepmann J et al, Blends of aqueous polymer dispersions used for pellet coating: importance of the particle size. J Control Release 2005; 105(3): 226-39; and Huyghebaert N, Vermeire A, Remon J P. In vitro evaluation of coating polymers for enteric coating and human ileal targeting. Int J Pharm 2005; 298(1): 26-37.

In another embodiment, Eudragit®, an acrylic polymer, is used as the enteric coating. The use of acrylic polymers for the coating of pharmaceutical preparations is well known in the art. Eudragit Acrylic Polymers have been shown to be safe, and are neither absorbed nor metabolized by the body, but rather are eliminated.

In another embodiment, the coating is a gelatin coating. In another embodiment, microencapsulation is used to protect the compound of (i) and the compound of (ii) against decomposition in the stomach.

In another embodiment, the coating is a film-coating. In another embodiment, the coating is ethylcellulose. In another embodiment, the coating is a water-based dispersion of ethylcellulose, e.g. hydroxypropylmethylcelullose (HPMC) E15. In another embodiment, the coating is a gastro-resistant coatings, e.g. a polymer containing carboxylic acid groups as a functional moiety. In another embodiment, the coating is a monolithic matrix. In another embodiment, the coating is a cellulose ether (e.g. hypromellose (HPMC).

In some embodiments, the oral composition is formulated as a solid oral dosage form. In one embodiment, the solid oral dosage form comprises tablets, chewable tablets, or capsules. In one embodiment the capsules are soft gelatin capsules. In another embodiment, capsules as described herein are hard-shelled capsules. In another embodiment, capsules as described herein are soft-shelled capsules. In another embodiment, capsules as described herein are made from gelatin. In another embodiment, capsules as described herein are made from plant-based gelling substances like carrageenans and modified forms of starch and cellulose.

In other embodiments, controlled- or sustained-release coatings utilized in methods and compositions of the present invention include formulation in lipophilic depots (e.g. fatty acids, waxes, oils).

In some embodiments, the site of disintegration and release of the solid dosage form may be designed depending on the pH of the targeted area, where absorption of the pemvidutide is desired, thus also includes acid resistant protective coatings.

The solid oral dosage form can also include, in another embodiment, incorporation of the compound of (i) and the compound of (ii) into or onto particulate preparations of polymeric compounds such as polylactic acid, polyglycolic acid, hydrogels, etc., or onto liposomes, microemulsions, micelles, unilamellar or multilamellar vesicles, erythrocyte ghosts, or spheroplasts. Such compositions will influence the physical state, solubility, stability, rate of in vivo release, and rate of in vivo clearance. In another embodiment, particulate compositions of the active ingredients are coated with polymers (e.g. poloxamers or poloxamines).

In another embodiment, the compound of (i) and the compound of (ii) can be delivered in a vesicle, e.g. a liposome (see Langer, Science 249:1527-1533 (1990); Treat et al., in Liposomes in the Therapy of Infectious Disease and Cancer, Lopez-Berestein and Fidler (eds.), Liss, N.Y., pp. 353-365 (1989); Lopez-Berestein, ibid., pp. 317-327; see generally ibid). In another embodiment, the compositions containing the Exenatide and omega-3 fatty acid are delivered in a vesicle, e.g. a liposome (see Langer, Science 249:1527-1533 (1990); Treat et al., in Liposomes in the Therapy of Infectious Disease and Cancer, Lopez-Berestein and Fidler (eds.), Liss, New York, pp. 353-365 (1989); Lopez-Berestein, ibid., pp. 317-327; see generally ibid).

The preparation of pharmaceutical compositions that contain an active component, for example by mixing, granulating, or tablet-forming processes, is well understood in the art. The active therapeutic ingredient is often mixed with excipients that are pharmaceutically acceptable and compatible with the active ingredient. For oral administration, the active ingredients of compositions of the present invention are mixed with additives customary for this purpose, such as vehicles, stabilizers, or inert diluents, and converted by customary methods into suitable forms for administration, such as tablets, coated tablets, hard or soft gelatin capsules, aqueous, alcoholic or oily solutions.

In some embodiments, the oral solid dosage form releases the compound of (i) and the compound of (ii) at pH of 4.5 and above, 4.75 and above, 5 and above, 5.25 and above, 5.5 and above, 5.75 and above, or 6 and above.

The site of disintegration and release of the solid oral dosage form may be designed using delayed-release technologies, such as, for example polymers with a controlled solubilization rate in aqueous medium, for instance, Eudragit RL or RS polymers.

In some embodiments, the solid oral dosage form of the pharmaceutical composition can be an immediate-release solid oral dosage form.

To be considered an immediate-release solid oral dosage form, the solid dosage oral form complies with the conditions described in in "Dissolution Testing and Acceptance Criteria for Immediate-Release Solid Oral Dosage Form Drug Products Containing High Solubility Drug Substances Guidance for Industry"—August 2018, whose contents are incorporated by reference in their entirety herein. (Additional copies are available from: Office of Communications, Division of Drug Information Center for Drug Evaluation and Research Food and Drug Administration 10001 New Hampshire Ave., Hillandale Bldg., 4th Floor Silver Spring, MD 20993-0002 Phone: 855-543-3784 or 301-796-3400; Fax: 301-431-6353 Email: druginfo@fda.hhs.gov; fda.gov/Drugs/GuidanceComplianceRegulatorylnformation/Guidances/default.htm).

In some embodiments, when the composition is placed in a release bath or placed in an environment in which the pH is 4.5 and above, 5 and above, 5.5 and above, or 6 and above, the solid form dosage may be considered as an Immediate-Release Solid Oral Dosage Form.

In some embodiments, the solid dosage oral form comprises from 50 to 250 mg, 60 to 200 mg, or 70 to 10 mg of SBTI, KTI, BBI, or SFTI and mixtures thereof. In an advantageous embodiment, the solid dosage oral form comprises SBTI.

In some embodiments, the composition comprises the compound of (i) and the compound of (ii), and a lubricant. In an advantageous embodiment, the composition comprises the compound of (i), AC-aa-NS, wherein the AC group comprises 8 carbon atoms, the compound of (ii), a protease inhibitor that is different from the AC-aa-NS, and a lubricant.

As used herein "AC" as used in AC-aa-NS means —COR$^1$ from Formula I. Thus, when AC comprises n carbon atoms, R$^1$ comprises (n−1) carbon atoms.

In some embodiments, the composition comprises the compound of (i) and the compound of (ii), and a lubricant comprising magnesium stearate or glyceryl dibehenate.

In some embodiments, the composition comprises the compound of (i) and the compound of (ii), and a further permeation enhancer.

In some embodiments, the composition comprises the compound of (i) and the compound of (ii), and a further permeation enhancer comprising a caprate, a caprylate, bile salts, or a salcaprozate. In an advantageous embodiment, the caprate comprises sodium caprate, the caprylate comprises sodium caprylate, and the salcaprozate comprises SNAC.

In some embodiments, the composition comprises the compound of (i) and the compound of (ii), and a pH modifier.

In some embodiments, the composition comprises the compound of (i) and the compound of (ii), and the pH modifier wherein the pH modifier comprises sodium carbonate, a phosphate, a citrate, citric acid, tartarate, or tartaric acid.

In some embodiments, the composition comprises the compound of (i) and the compound of (ii), and the protease inhibitor that is different from the AC-aa-NS.

In some embodiments, the composition comprises the compound of (i) and the compound of (ii), the pH modifier, and the protease inhibitor that is different from the AC-aa-NS.

In some embodiments, the composition comprises the compound of (i) and the compound of (ii), the further permeation enhancer, and the protease inhibitor that is different from the AC-aa-NS.

In some embodiments, the composition comprises the compound of (i) and the compound of (ii), the lubricant, and a protease inhibitor that is different from the AC-aa-NS.

In some embodiments, the composition comprises the compound of (i) and the compound of (ii), the pH modifier, the further permeation enhancer, and the protease inhibitor that is different from the AC-aa-NS.

In some embodiments, the composition comprises NaGly (N-Bn)C8, the compound of (ii), and the lubricant.

In some embodiments, the composition comprises NaGly (N-Bn)C8, the compound of (ii), and the lubricant comprising magnesium stearate or glyceryl dibehenate.

In some embodiments, the composition comprises NaGly (N-Bn)C8, the compound of (ii), and the further permeation enhancer.

In some embodiments, the composition comprises NaGly (N-Bn)C8, the compound of (ii), and the further permeation enhancer comprising a caprate, a caprylate, bile salts, or a salcaprozate. In an advantageous embodiment, the caprate comprises sodium caprate, the caprylate comprises sodium caprylate, and the sacaprozate comprises SNAC.

In some embodiments, the composition comprises NaGly (N-Bn)C8, the compound of (ii), and the pH modifier.

In some embodiments, the composition comprises NaGly (N-Bn)C8, the compound of (ii), and the pH modifier sodium carbonate, a phosphate, a citrate, citric acid, tartarate, or tartaric acid.

In some embodiments, the composition comprises NaGly (N-Bn)C8, the compound of (ii), the pH modifier and the protease inhibitor that is different from the AC-aa-NS.

In some embodiments, the composition comprises NaGly (N-Bn)C8, the compound of (ii), the further permeation enhancer, and the protease inhibitor that is different from the AC-aa-NS.

In some embodiments, the composition comprises NaGly (N-Bn)C8, the compound of (ii), the lubricant and the protease inhibitor that is different from the AC-aa-NS.

In some embodiments, the composition comprises NaGly (N-Bn)C8, the compound of (ii), the pH modifier, the further permeation enhancer, and the protease inhibitor that is different from the AC-aa-NS.

In some embodiments, the composition comprises the compound of (i) and the compound of (ii), and the lubricant wherein the lubricant is magnesium stearate.

In some embodiments, the composition comprises the compound of (i) and the compound of (ii), and the lubricant wherein the lubricant is glyceryl dibehenate.

In some embodiments, the composition comprises the compound of (i) and the compound of (ii), and the pH modifier.

In some embodiments, the composition comprises the compound of (i) and the compound of (ii), and the pH modifier wherein the pH modifier is sodium carbonate.

In some embodiments, the composition comprises the compound of (i) and the compound of (ii), the lubricant and the pH modifier.

In some embodiments, the composition comprises the compound of (i) and the compound of (ii), the lubricant wherein the lubricant is magnesium stearate and the pH modifier.

In some embodiments, the composition comprises the compound of (i) and the compound of (ii), the lubricant wherein the lubricant is magnesium stearate and the pH modifier wherein the pH modifier is sodium carbonate.

In some embodiments, the composition comprises the compound of (i) and the compound of (ii), the lubricant wherein the lubricant is glyceryl dibehenate and the pH modifier.

In some embodiments, the composition comprises the compound of (i) and the compound of (ii), and the lubricant wherein the lubricant is glyceryl dibehenate and the pH modifier wherein the pH modifier is sodium carbonate.

In some embodiments, the composition comprises the compound of (i) and the compound of (ii), the lubricant, and a disintegrant.

In some embodiments, the composition comprises the compound of (i) and the compound of (ii), the lubricant wherein the lubricant is magnesium stearate and the disintegrant.

In some embodiments, the composition comprises the compound of (i) and the compound of (ii), the lubricant wherein the lubricant is glyceryl dibehenate and the disintegrant.

In some embodiments, the composition comprises the compound of (i) and the compound of (ii), the lubricant, the pH modifier, and the disintegrant.

In some embodiments, the composition comprises the compound of (i) and the compound of (ii), a lubricant wherein the lubricant is magnesium stearate, the pH modifier, and the disintegrant.

In some embodiments, the composition comprises the compound of (i) and the compound of (ii), a lubricant which is magnesium stearate, a pH modifier which is sodium carbonate and a disintegrant.

In some embodiments, the composition comprises the compound of (i) and the compound of (ii), the lubricant wherein the lubricant is glyceryl dibehenate, the pH modifier, and the disintegrant.

In some embodiments, the composition comprises the compound of (i) and the compound of (ii), the lubricant wherein the lubricant is glyceryl dibehenate, the pH modifier wherein the pH modifier is sodium carbonate, and the disintegrant.

In some embodiments, the composition comprises the compound of (i), AC-aa-NS, with an AC group comprising 8 carbon atoms and an aa comprising an aromatic amino acid comprising Phenylalanine (Phe), Phenylglycine (PGly), Tryptophane (Trp) or Tyrosine (Tyr), the compound of (ii), the lubricant wherein the lubricant is magnesium stearate, the pH modifier, and the disintegrant.

In some embodiments, the composition comprises the compound of (i), AC-aa-NS, with the AC group comprising 8 carbon atoms and the aa comprising the aromatic amino acid comprising Phenylalanine (Phe), Phenylglycine (PGly), Tryptophane (Trp) or Tyrosine (Tyr), the compound of (ii), the lubricant wherein the lubricant is magnesium stearate, the pH modifier wherein the pH modifier is sodium carbonate and the disintegrant.

In some embodiments, the composition comprises the compound of (i), AC-aa-NS, with the AC group comprising 8 carbon atoms and the aa comprising the aromatic amino acid comprising Phenylalanine (Phe), Phenylglycine (PGly), Tryptophane (Trp) or Tyrosine (Tyr), the compound of (ii), the lubricant wherein the lubricant is glyceryl dibehenate, the pH modifier, and the disintegrant.

In some embodiments, the composition comprises NaGly (N-Bn)C8, the compound of (ii), the lubricant wherein the lubricant is glyceryl dibehenate, the pH modifier wherein the pH modifier is sodium carbonate and the disintegrant.

In some embodiments, the composition comprises NaGly (N-Bn)C8, the compound of (ii), the lubricant, the pH modifier, and the disintegrant.

In some embodiments, the composition comprises NaGly (N-Bn)C8, the compound of (ii), the lubricant, the pH modifier wherein the pH modifier is sodium carbonate, and the disintegrant.

In some embodiments, the composition comprises NaGly (N-Bn)C8, the compound of (ii), the lubricant, the pH modifier, the disintegrant, and the protease inhibitor that is different from the AC-aa-NS.

In some embodiments, the composition comprises NaGly (N-Bn)C8, the compound of (ii), the lubricant, the pH modifier wherein the pH modifier is sodium carbonate, the disintegrant, and the protease inhibitor that is different from the AC-aa-NS.

In some embodiments, the composition comprises NaGly (N-Bn)C8, the compound of (ii), the lubricant wherein the lubricant is magnesium stearate, the pH modifier and the disintegrant.

In some embodiments, the composition comprises NaGly (N-Bn)C8, the compound of (ii), the lubricant wherein the lubricant is magnesium stearate, the pH modifier wherein the pH modifier is sodium carbonate, and the disintegrant.

In some embodiments, the composition comprises NaGly (N-Bn)C8, the compound of (ii), the lubricant wherein the lubricant is glyceryl dibehenate, the pH modifier and the disintegrant.

In some embodiments, the composition comprises the AC-aa-NS with the AC group comprising 8 carbon atoms and the compound of (ii).

In some embodiments, the composition comprises the compound of (i), and the further permeation enhancer. In an advantageous embodiment, the further permeation enhancer is SNAC.

In some embodiments, the composition comprises the compound of (i), AC-aa-NS, and the protease inhibitor that is different from the AC-aa-NS. In an advantageous embodiment, the protease inhibitor that is different from the AC-aa-NS comprises SBTI, BBI or KTI.

In some embodiments, the composition comprises the compound of (i), AC-aa-NS, and the protease inhibitor that is different from the AC-aa-NS. In an advantageous embodiment, the protease inhibitor that is different from the AC-aa-NS comprises SBTI, BBI or KTI, and mixtures thereof. In yet another advantageous embodiment, the protease inhibitor that is different from the AC-aa-NS comprises from 100 to 400 mg/g of SBTI.

In some embodiments, the composition comprises the compound of (i), AC-aa-NS, and the protease inhibitor that is different from the AC-aa-NS. In an advantageous embodiment, the protease inhibitor that is different from the AC-aa-NS comprises SBTI, BBI or KTI, and mixtures thereof. In yet another advantageous embodiment, the protease inhibitor that is different from the AC-aa-NS comprises from 120 to 300 mg/g of SBTI.

In some embodiments, the composition comprises the compound of (i), AC-aa-NS, and the protease inhibitor that is different from the AC-aa-NS. In an advantageous embodiment, the protease inhibitor that is different from the AC-aa-NS comprises SBTI, BBI or KTI, and mixtures thereof. In yet another advantageous embodiment, the protease inhibitor that is different from the AC-aa-NS comprises from 140 to 250 mg/g of SBTI.

In some embodiments, the composition comprises the compound of (i), AC-aa-NS, and the protease inhibitor that is different from the AC-aa-NS. In an advantageous embodiment, the protease inhibitor that is different from the AC-aa-NS comprises SBTI, BBI or KTI, and mixtures thereof. In yet another advantageous embodiment, the protease inhibitor that is different from the AC-aa-NS comprises from 150 to 200 mg/g of SBTI.

In some embodiments, the composition comprises the compound of (I), and a chelator of divalent cations. In an advantageous embodiment, the chelator of divalent cations comprises EDTA.

In some embodiments, the composition comprises the compound of (I), and the pH modifier. In an advantageous embodiment, the pH modifier comprises sodium carbonate.

In some embodiments, the composition comprises the compound of (I), and the disintegrant. In an advantageous embodiment, the disintegrant comprises croscarmellose.

In some embodiments, the composition comprises the compound of (I), the further permeation enhancer, and the protease inhibitor that is different from the AC-aa-Ns. In an advantageous embodiment, the permeation enhancer comprises SNAC and the protease inhibitor that is different from the AC-aa-Ns comprises SBTI, BBI or KTI.

In some embodiments, the composition comprises the compound of (I), the further permeation enhancer and the chelator of divalent cations. In an advantageous embodiment, the permeation enhancer comprises SNAC and the chelator of divalent cations comprises EDTA.

In some embodiments, the composition comprises the compound of (I), the further permeation enhancer, and the pH modifier. In some embodiments, the pH modifier comprises a carbonate. In an advantageous embodiment, the permeation enhancer comprises SNAC and the pH modifier comprises sodium carbonate.

In some embodiments, the composition comprises the compound of (I), the further permeation enhancer, and the disintegrant. In an advantageous embodiment, the permeation enhancer comprises SNAC and the disintegrant comprises croscarmellose.

In some embodiments, the composition comprises the compound of (I), the protease inhibitor that is different from the AC-aa-Ns, and the chelator of divalent cations. In an advantageous embodiment, the protease inhibitor that is different from the AC-aa-Ns comprises SBTI, BBI or KTI and the chelator of divalent cations comprises EDTA.

In some embodiments, the composition comprises the compound of (I), the protease inhibitor that is different from the AC-aa-Ns, and the pH modifier. In some embodiments, the pH modifier comprises a carbonate. In an advantageous embodiment, the protease inhibitor that is different from the AC-aa-Ns comprises SBTI, BBI or KTI and the pH modifier comprises sodium carbonate.

In some embodiments, the composition comprises the compound of (I), the protease inhibitor that is different from the AC-aa-Ns, and the disintegrant. In an advantageous embodiment, the protease inhibitor that is different from the AC-aa-Ns comprises SBTI, BBI or KTI, and the disintegrant comprises croscarmellose.

In some embodiments, the composition comprises the compound of (I) according to Formula I, Formula Ia, or wherein the AC group comprises —$COR^1$ wherein $R^1$ comprises a C7 or C8 alkyl, the compound of (ii), the further permeation enhancer, the protease inhibitor that is different from the AC-aa-NS, and the chelator of divalent cations. In an advantageous embodiment, the further permeation enhancer comprises SNAC, the protease inhibitor that is different from the AC-aa-NS comprises SBTI, BBI or KTI, and the chelator of divalent cations comprises EDTA.

In some embodiments, the composition comprises the compound of (I), the further permeation enhancer, the protease inhibitor that is different from the AC-aa-NS, and a pH modifier. In some embodiments, the pH modifier comprises a carbonate. In an advantageous embodiment, the further permeation enhancer comprises SNAC, the protease inhibitor that is different from the AC-aa-NS comprises SBTI, BBI or KTI, and the pH modifier comprises sodium carbonate.

In some embodiments, the composition comprises the compound of (I), the further permeation enhancer, the protease inhibitor that is different from the AC-aa-NS, and the disintegrant. In an advantageous embodiment, the further permeation enhancer comprises SNAC, the protease inhibitor that is different from the AC-aa-NS comprises SBTI, BBI or KTI, and the disintegrant comprises croscarmellose.

In some embodiments, the composition comprises the compound of (I), the further permeation enhancer, the chelator of divalent cations, and the pH modifier. In some embodiments, the pH modifier comprises a carbonate. In an advantageous embodiment, the further permeation enhancer comprises SNAC, the chelator of divalent cations comprises EDTA, and the pH modifier comprises sodium carbonate.

In some embodiments, the composition comprises the compound of (I), the further permeation enhancer, the chelator of divalent cations, and the disintegrant. In an advantageous embodiment, the further permeation enhancer comprises SNAC, the chelator of divalent cations comprises EDTA, and the disintegrant comprises croscarmellose.

In some embodiments, the composition comprises the compound of (I), the protease inhibitor that is different from the AC-aa-NS, the chelator of divalent cations, and the pH modifier. In some embodiments, the pH modifier comprises a carbonate. In an advantageous embodiment, the protease inhibitor that is different from the AC-aa-NS comprises SBTI, BBI or KTI, the chelator of divalent cations comprises EDTA, and the pH modifier comprises sodium carbonate.

In some embodiments, the composition comprises the compound of (I), the protease inhibitor that is different from the AC-aa-NS, the chelator of divalent cation, and the disintegrant. In an advantageous embodiment, the protease inhibitor that is different from the AC-aa-NS comprises SBTI, BBI or KTI, the chelator of divalent cations comprises EDTA, and the disintegrant comprises croscarmellose.

In some embodiments, the composition comprises the compound of (I), the protease inhibitor that is different from the AC-aa-NS, the pH modifier, and the disintegrant. In some embodiments, the pH modifier comprises a carbonate. In an advantageous embodiment, the protease inhibitor that is different from the AC-aa-NS comprises SBTI, BBI or KTI, the pH modifier comprises sodium carbonate, and the disintegrant comprises croscarmellose.

In some embodiments, the composition comprises the compound of (I), the further permeation enhancer, the protease inhibitor that is different from the AC-aa-NS, the chelator of divalent cations, and the pH modifier. In some embodiments, the pH modifier comprises a carbonate. In an advantageous embodiment, the further permeation enhancer comprises SNAC, the protease inhibitor that is different from the AC-aa-NS comprises SBTI, BBI or KTI, the chelator of divalent cations comprises EDTA, and the pH modifier comprises sodium carbonate.

In some embodiments, the composition comprises the compound of (I), the further permeation enhancer, the protease inhibitor that is different from the AC-aa-NS, the chelator of divalent cations, and the disintegrant. In an advantageous embodiment, the further permeation enhancer comprises SNAC, the protease inhibitor that is different from the AC-aa-NS comprises SBTI, BBI or KTI, the chelator of divalent cations comprises EDTA, and the disintegrant comprises croscarmellose.

In some embodiments, the composition comprises the compound of (I), the further permeation enhancer, the protease inhibitor that is different from the AC-aa-NS, the pH modifier, and the disintegrant. In some embodiments, the pH modifier comprises a carbonate. In an advantageous embodiment, the further permeation enhancer comprises SNAC, the protease inhibitor that is different from the AC-aa-NS comprises SBTI, BBI or KTI, the pH modifier comprises sodium carbonate, and the disintegrant comprises croscarmellose.

In some embodiments, the composition comprises the compound of (I), the further permeation enhancer, the chelator of divalent cations, the pH modifier, and the disintegrant. In some embodiments, the pH modifier comprises a carbonate. In an advantageous embodiment, the further permeation enhancer comprises SNAC, the chelator of divalent cations comprises EDTA, the pH modifier comprises sodium carbonate, and the disintegrant comprises croscarmellose.

In some embodiments, the composition comprises the compound of (I), the protease inhibitor that is different from the AC-aa-NS, the chelator of divalent cation, the pH modifier, and the disintegrant. In some embodiments, the pH modifier comprises a carbonate. In an advantageous embodiment the protease inhibitor that is different from the AC-aa-NS comprises SBTI, BBI or KTI, the chelator of divalent cation comprises EDTA, the pH modifier comprises sodium carbonate, and the disintegrant comprises croscarmellose.

In some embodiments, the composition comprises the compound of (I), the further permeation enhancer, the protease inhibitor that is different from the AC-aa-NS, the chelator of divalent cations, the pH modifier, and the disintegrant. In some embodiments, the pH modifier comprises a carbonate. In an advantageous embodiment, the further permeation enhancer comprises SNAC, the protease inhibitor that is different from the AC-aa-NS comprises SBTI, BBI or KTI, the chelator of divalent cation comprises EDTA, the pH modifier comprises sodium carbonate, and the disintegrant comprises croscarmellose.

In some embodiments, the solid composition comprises from 1 to 10% w/w of the compound of (ii), 50 to 95% w/w of the compound of (i) according to Formula I, and 0 to 15% of the pH modifier.

In some embodiments, the solid composition comprises from 1 to 10% w/w of the compound of (ii), 50 to 95% w/w of the compound of (i) according to Formula I, 2 to 20% w/w of the protease inhibitor that is different from the AC-aa-NS, and 0 to 15% of the pH modifier.

In an advantageous embodiment, the compound of (i) is according to Formula I wherein $R^1$ is an alkyl group comprising 6 to 8 carbon atoms.

In an advantageous embodiment, the compound of (i) is according to Formula I wherein $R^2$ is —$(CH_2)_m$-Aro, wherein m is an integer having a value from 1 to 4 and Aro is phenyl.

In an advantageous embodiment, the compound of (i) is according to Formula I wherein $R^1$ is an alkyl comprising 6 to 8 carbon atoms and $R^2$ is —$(CH_2)_m$-Aro, wherein m is an integer having a value from 1 to 4 and Aro is phenyl.

In an advantageous embodiment, the compound of (i) according to Formula I is NaGly(N-Bn)C8.

In an advantageous embodiment the protease inhibitor that is different from the AC-aa-NS comprises SBTI, BBI, KTI, or SFTI, and mixtures thereof.

In an advantageous embodiment, the pH modifier comprises sodium carbonate.

According to another aspect of the present invention, the present invention also relates to a method of treating or preventing a disease comprising the step of administering the pharmaceutical composition to a subject.

In some embodiments, the administering step can comprise orally taking the solid composition as described herein. In an advantageous embodiment, the administering step can comprise In some embodiments, the composition is for use as a medicament.

In some embodiments, the composition is for preventing or treating obesity, Diabetes Type 2, non alcoholic steatohepatitis (NASH), metabolic dysfunction-associated steatohepatitis (MASH), or neuro-degenerative diseases, such as Alzheimer's Disease and Parkinson's Disease.

In some embodiments, the composition is for preventing or treating obesity.

In some embodiments, the composition is for preventing or treating Diabetes Type 2.

In some embodiments, the composition is for preventing or treating NASH.

In some embodiments, the composition is for preventing or treating MASH.

In some embodiments, the composition is for preventing or treating neuro-degenerative diseases, such as Alzheimer's Disease and Parkinson's Disease.

In some embodiments, the composition is for preventing or treating Alzheimer's Disease.

In some embodiments, the composition is for preventing or treating Parkinson's Disease.

Dosage levels of between about 0.01 and about 100 mg/kg body weight per day, between 0.5 and about 75 mg/kg body weight per day, or between about 1 and 50 mg/kg body weight per day of the active ingredient (e.g., pemvidutide) in combination with the permeation enhancer AC-aa-NS are useful for the prevention and treatment of the aforementioned diseases. In an advantageous embodiment, the dosage level can comprise a 25 mg capsule per day. In another advantageous embodiment, the dosage is about 0.25 mg/kg per day.

Also contemplated is the frequency of dosage. In some embodiments, the composition as described herein is taken once a day. In some embodiments, the composition as described herein is taken twice a day. In some embodiments, the composition as described herein is taken three times a day.

In some embodiments, the composition as described herein is taken every other day. In some embodiments, the composition as described herein is taken once weekly. In some embodiments, the composition as described herein is taken biweekly. In some embodiments, the composition as described herein is taken monthly. In another embodiment, one of skill in the art determines the dosage of the composition as described herein as described herein. In another embodiment, one of skill in the art determines the daily dose of the composition as described herein. In another embodiment, one of skill in the art determines the daily dosing regimen of the composition as described herein.

In some embodiments, dosing occurs before a meal. In some embodiments, dosing occurs after a meal. In an advantageous embodiment, dosage occurs before a meal in a fasted state.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

The AC-aa-NS may be obtained by acylation of aminoacids, which may be readily performed using acylation agents known in the art that react with e.g. the free alpha-amino group. The amino acid may be attached to the acid via an N-acylation, i.e. resulting in an amide bond. AC-aa's of the invention may be prepared using the method described in Leone-Bay et al (1995): "N-acylated alpha-amino acids as novel oral delivery agents for proteins", Journal of Medicinal Chemistry, 38(21), 4263-4269. The alkylation of the nitrogen of the nitrogen of the amino acid may be performed by classic reactions.

Part A—Preparation of compositions

A.1. Solid compositions

Process A-1

The solid compositions were prepared by first mixing together the AC-aa-NS with pemvidutide in appropriate proportions, as well as other excipients in aqueous solution. Total solute concentration was in the range 20-500 mg/g of solution. This solution was freeze-dried to yield a homogeneous solid lyophilisate. A mortar and pestle was used to crush this solid into a powder suitable for further processing. The resulting blend was then introduced manually in Enteric VCaps, size 00 (Capsugel).

Capsules were then sealed using the following protocol: 10 µL of a 50/50 vol/vol mixture of ethanol and water were introduced between the lower part and the upper lid of the capsule using a syringe. The sealing solution was then dried under hot air (45° C.) for one minute, leading to an impermeable seal between both parts of the capsule.

Example A.1.1: Solid Composition Incorporating NaGly(N-Bn)C8 Pemvidutide and a Protease Inhibitor—SBTI Composition A.1.1 was prepared according to process A.1 leading to a content per capsule of 25 mg of pemvidutide, 450 mg of NaGly(N-Bn)C8, 40 mg of sodium carbonate, 80 mg of SBTI.

Part C-Pharmacokinetics

Example C1: Pharmacokinetic Studies in Beagle Dogs

Two independent pharmacokinetic (PK) studies were conducted in Beagle dogs to estimate the exposure of pemvidutide after oral administration of the composition A.1.1 comprising pemvidutide and NaGly(N-Bn)C8 described in example A.1.1.

In both studies, a group of 10 Beagle dogs weighing approximately 10 kg, was fasted overnight before the start of the experiment and from 0 to 6 h after dosing. Each dog received an oral a capsule containing the composition A.1.1.

Blood samples were collected at predefined time points up to 72 h. Pemvidutide concentrations were determined using an HPLC-MS/MS method. Non-compartmental PK analysis was performed using individual concentration-time profiles.

Results

In the first study, oral administration of the composition A.1.1 led to pemvidutide exposure in all ten dogs. The median AUClast of pemvidutide was 225 h*ng/mL (CV: 119%).

The second study confirmed these results, showing pemvidutide exposure in all ten dogs. The median AUClast of pemvidutide was 246 h*ng/mL (CV %:59).

These results demonstrated that the composition described in example A.1.1 allows oral absorption of the pemvidutide. Moreover, a low inter studies variability was demonstrated with this composition.

The invention is further described by the following numbered paragraphs:

1. A pharmaceutical composition comprising
   (i) a compound AC-aa-NS comprising an acetylated amino acid, wherein AC-aa-NS has the following general Formula I:

$$R^3OOC\text{—}CHR^4\text{—}(CH_2)_n\text{—}NR^2\text{—}COR^1 \qquad \text{Formula I}$$

wherein:
   n is an integer having a value of 0, 1, 2, 3, 4 or 5;
   $R^1$ is an alkyl comprising 5 to 15 carbon atoms, an alkyl comprising 7 to 17 carbon atoms and a carboxyl group, or an alkyl comprising 7 to 17 carbon atoms and a hydroxyl group;
   $R^2$ is an alkyl comprising 2 to 8 carbon atoms or comprises —$(CH_2)_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by an alkyl comprising 1 to 3 carbon atoms, a methoxy group, or a halogen;
   $R^4$ is an α-carbon side chain of an amino acid, said amino acid comprising Glycine (Gly), Alanine (Ala), Valine (Val), Leucine (Leu), Isoleucine (Ile), Phenylalanine (Phe), N-methyl Phenylalanine (NMePhe), pipecolinic acid (Pip), Phenylglycine (PGly), Tryptophane (Trp), Methionine (Met), Proline (Pro), Serine (Ser), Threonine (Thr), Cysteine (Cys), Tyrosine (Tyr), Asparagine (Asn), Glutamine (Gln), Aspartic acid (Asp), Glutamic acid (Glu), hydroxyproline (Hyp), phosphoserine, alpha-aminoisobutyric acid (Aib), alpha-aminobutyric acid (Abu), or tert-butyl-glycine;
   or $R^2$ and $R^4$ together form —$(CH_2)_o$—Ar—$(CH_2)_p$—, wherein —$(CH_2)_o$— bonds to $R^2$ and —$(CH_2)_p$-bonds to $R^4$, o has a value of 0 or 1, p has a value of 0, 1 or 2, the sum of o and p being 1 or 2, and Ar comprising a phenyl group or an indole group;
   wherein a first ring carbon atom of Ar bonds to —$(CH_2)_o$— and a second ring carbon of Ar, which is adjacent to the first carbon ring atom, bonds to —$(CH_2)_p$—; and
   $R^3$ is hydrogen or a cation;
   and
   (ii) a compound having at least 90% sequence identity to:

(SEQ ID NO: 1)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(17-carboxyl-heptadecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 2)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 3)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-tetradecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 4)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-hexadecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

-continued (SEQ ID NO: 5)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-octadecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 6)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-dodecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-dodecyl beta-D-glucouronyl))$_{24}$-Trp$_{25}$-Leu$_{26}$-Leu$_{27}$-Gln$_{28}$-Thr$_{29}$-NH$_2$;

(SEQ ID NO: 7)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-tetradecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-tetradecyl beta-D-glucouronyl))$_{24}$-Trp$_{25}$-Leu$_{26}$-Leu$_{27}$-Gln$_{28}$-Thr$_{29}$-NH$_2$;

(SEQ ID NO: 8)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-hexadecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-hexadecyl beta-D-glucouronyl))$_{24}$-Trp$_{25}$-Leu$_{26}$-Leu$_{27}$-Gln$_{28}$-Thr$_{29}$-NH$_2$;

(SEQ ID NO: 9)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(13-carboxyl-tridecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 10)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(15-carboxyl-pentadecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 11)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln17Ala$_{18}$-Ala$_{19}$-Lys$_{20}$Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 12)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 13)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(17-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 14)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(13-carboxyl-tridecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 15)
His$_1$-Aib$_2$-Gln$_3$-Gly$_4$-Thr$_5$-Phe$_6$-Thr$_7$-Sers-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(15-carboxyl-pentadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

-continued (SEQ ID NO: 16)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(17-carboxyl-heptadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 17)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 18)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 19)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys(N-omega(1-(17-carboxyl-heptadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 20)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 21)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

(SEQ ID NO: 22)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$; or (SEQ ID NO: 23)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Gln$_{17}$-Ala$_{18}$-Ala$_{19}$-Gln$_{20}$-Glu$_{21}$-Phe$_{22}$-Ile$_{23}$-Lys$_{24}$-Trp$_{25}$-Leu$_{26}$-Leu$_{27}$-Gln$_{28}$-Thr$_{29}$-NH$_2$;

and
a pharmaceutically acceptable carrier or excipient.

2. The pharmaceutical composition of paragraph 1, wherein in (i):
n is 0; or
$R^1$ is a linear or branched alkyl group; or.
$R^1$ is a linear alkyl group comprising 7 carbon atoms;
the carboxyl group is a carboxyl group of a carboxylic acid, acid anhydride, or ester; or
the carboxyl group is a terminal carboxyl group; or
the hydroxyl group is a terminal hydroxyl group; or
$R^2$ is an alkyl comprising 2 to 8 carbon atoms; or
$R^2$ is —(CH$_2$)$_m$-Aro, wherein m is an integer having a value from 1 to 4, Aro comprises an aryl or heteroaryl group, wherein said aryl or heteroaryl group comprises phenyl, naphtyl, anthracyl, indole, or pyridinyl, wherein said aryl or heteroaryl group is optionally substituted by alkyl comprising 1 to 3 carbon atoms, a methoxy group, or a halogen; or
$R^4$ comprises the α-carbon side chain of glycine; or
$R^2$ and $R^4$ together form —(CH$_2$)$_o$—Ar—(CH$_2$)$_p$—.

3. The pharmaceutical composition of paragraph 1, wherein in (i) m is 1; or
$R^2$ and $R^4$ together form —(CH$_2$)$_o$—Ar—(CH$_2$)$_p$— wherein one of o or p is 1 and the other is 0 or o and p are each 1.

4. The pharmaceutical composition of paragraph 1, wherein in (i), $R^4$ comprises the α-carbon side chain of glycine and n is 4; or Aro comprises an unsubstituted phenyl group; or
$R^2$ and $R^4$ together form —(CH$_2$)$_o$—Ar—(CH$_2$)$_p$— wherein Ar comprises a phenyl group or an indole group.

5. The pharmaceutical composition of paragraph 1, wherein $R^3$ is hydrogen or an alkali metal cation, wherein the alkali metal cation is a lithium, sodium, or potassium cation.

6. The pharmaceutical composition of paragraph 1, wherein in (i), the compound comprises a structure of:

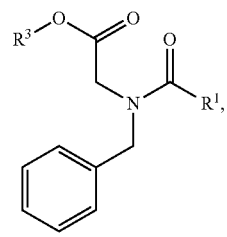

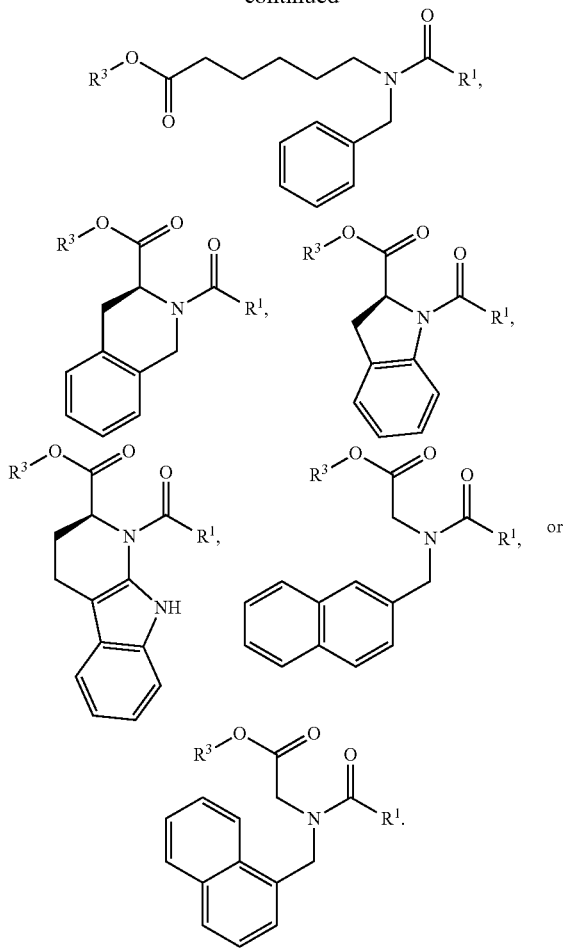

7. The pharmaceutical composition of paragraph 1, wherein the compound is NaGly(N-Bn)C8 having the structure:

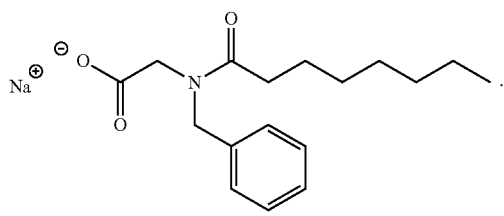 [SMILES: [Na+] ; CCCCCCCC(=O)N(CC(=O)[O-])Cc1ccccc1]

8. The pharmaceutical composition of paragraph 1, wherein the compound of (ii) comprises pemvidutide.
9. The pharmaceutical composition of paragraph 1, wherein the compound of (ii) has at least 90% sequence identity to SEQ ID NO: 1 or SEQ ID NO: 2; or the compound has at least 95% sequence identity to SEQ ID NO: 1 or SEQ ID NO: 2; or the compound has at least 99% sequence identity to SEQ ID NO: 1 or SEQ ID NO: 2.
10. The pharmaceutical composition of paragraph 1, comprising about 0.5 to about 20 wt % of the compound of (ii).
11. The pharmaceutical composition of paragraph 1, comprising at least 300 mg/g of the compound of (i) relative to the total weight of the composition; or the weight ratio of the compound of (i) to the compound of (ii) is from about 1:1 to about 200:1.
12. The pharmaceutical composition of paragraph 1, comprising an excipient, wherein the excipient comprises a lubricant, surfactant, pH modifier, disintegrant, binders, filler, glidant, diluent, polymer for sustained or delayed release, or a preservative.
13. The pharmaceutical composition of paragraph 12, wherein the pH modifier comprises sodium carbonate, phosphates, citrates, citric acid, tartarate or tartaric acid; or the lubricant comprises magnesium stearate or glyceryl dibehenate the disintegrant comprises croscarmellose.
14. The pharmaceutical composition of paragraph 12, comprising at most 15% w/w of the pH modifier; or comprising less than 5% w/w of the lubricant; or comprising about 0.25 and about 2.5% w/w of the disintegrant.
15. The pharmaceutical composition of paragraph 1, further comprising a serine protease inhibitor or a permeation enhancer.
16. The pharmaceutical composition of paragraph 15, wherein the serine protease inhibitor comprises SBTI; or the permeation enhancer comprises sodium salcaprozate.
17. The pharmaceutical composition of paragraph 15, comprising 100 to 400 mg/g of the serine protease inhibitor; or comprising at least 300 mg/g of the permeation enhancer.
18. The pharmaceutical composition of paragraph 1, comprising pemvidutide, NaGly(N-Bn)C8, sodium carbonate, and SBTI.
19. The pharmaceutical composition of paragraph 1, wherein the pharmaceutical composition is an oral composition.
20. The pharmaceutical composition of paragraph 1, wherein the pharmaceutical composition is a solid composition.
21. The pharmaceutical composition of paragraph 20, wherein the solid composition is a unitary solid dosage.
22. The pharmaceutical composition of paragraph 21, wherein the unitary solid dosage comprises pemvidutide and NaGly(N-Bn)C8.
23. The pharmaceutical composition of paragraph 21, wherein the unitary solid dosage is in the form of capsules, tablets, dragees, pills, lozenges, powders, or granules.
24. A method of treating obesity, type II diabetes, or non alcoholic steatohepatitis comprising administering to a subject, the pharmaceutical composition of paragraph 1.
25. The method of paragraph 24, wherein the administering step comprises orally administering the pharmaceutical composition.
26. The method of paragraph 25, comprising orally administering to the subject the pharmaceutical composition comprising pemvidutide and NaGly(N-Bn)C8.
27. The method of paragraph 26, wherein the pharmaceutical composition adminstered orally further comprises SBTI.
28. The method of paragraph 24, wherein the administering step occurs once daily; or
the administering step occurs twice daily; or
the administering step occurs weekly; or
the administering step occurs monthly.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A pharmaceutical composition comprising of (i) a compound comprising a structure of:

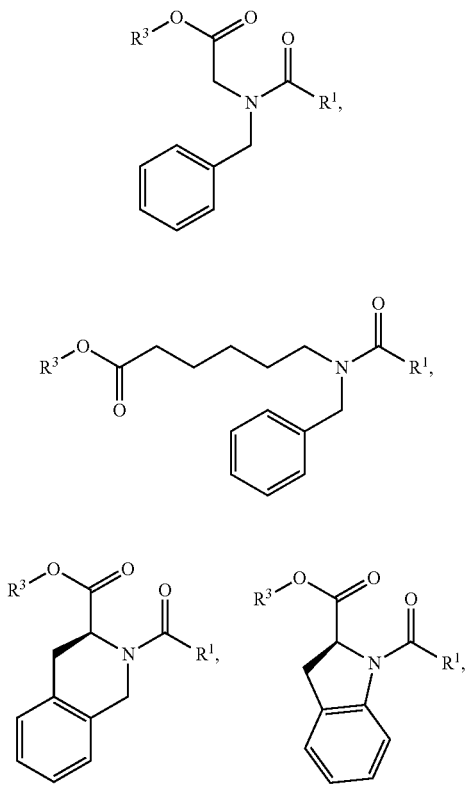

wherein $R^1$ is an alkyl comprising 5 to 15 carbon atoms, an alkyl comprising 7 to 17 carbon atoms and a carboxyl group, or an alkyl comprising 7 to 17 carbon atoms and a hydroxyl group; and $R^3$ is hydrogen or a cation; and (ii) a compound comprising a sequence having at least 90% sequence identity to:

(SEQ ID NO: 1)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(17-carboxyl-heptadecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 2)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 3)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-tetradecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 4)
His$_1$-Aib$_2$-Gln$_3$-Gly$_4$-Thr$_5$-Phe$_6$-Thr$_7$-Sers-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-hexadecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 5)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-octadecyl alpha-D-melibiouronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

-continued (SEQ ID NO: 6)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-dodecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-dodecyl beta-D-glucouronyl))$_{24}$-Trp$_{25}$-Leu$_{26}$-Leu$_{27}$-Gln$_{28}$-Thr$_{29}$-NH$_2$;

(SEQ ID NO: 7)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-tetradecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-tetradecyl beta-D-glucouronyl))$_{24}$-Trp$_{25}$-Leu$_{26}$-Leu$_{27}$-Gln$_{28}$-Thr$_{29}$-NH$_2$;

(SEQ ID NO: 8)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-hexadecyl alpha-D-melibiouronyl))$_{17}$-Ala$_{18}$-Ala$_{19}$-Lys$_{20}$-Glu$_{21}$-Phe$_{22}$-Ile$_{23}$-Lys(N-omega(1-hexadecyl beta-D-glucouronyl))$_{24}$-Trp$_{25}$-Leu$_{26}$-Leu$_{27}$-Gln$_{28}$-Thr$_{29}$-NH$_2$;

(SEQ ID NO: 9)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(13-carboxyl-tridecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 10)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Lys(N-omega(1-(15-carboxyl-pentadecyloxy)beta-D-glucuronyl))$_{17}$-Ala$_{18}$-Ala$_{19}$-Lys$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 11)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln17Ala$_{18}$-Ala$_{19}$-Lys$_{20}$Glu$_{21}$-Phe$_{22}$-Ile$_{23}$-Lys(N-omega(1-(13-carboxyl-tridecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 12)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(15-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 13)
His$_1$-Aib$_2$-Gln$_3$-Gly$_4$-Thr$_5$-Phe$_6$-Thr$_7$-Ser$_8$-Asp$_9$-Tyr$_{10}$-Ser$_{11}$-Lys$_{12}$-Tyr$_{13}$-Leu$_{14}$-Asp$_{15}$-Glu$_{16}$-Gln$_{17}$-Ala$_{18}$-Ala$_{19}$-Lys$_{20}$-Glu$_{21}$-Phe$_{22}$-Ile$_{23}$-Lys(N-omega(1-(17-carboxyl-pentadecyloxy)beta-D-glucuronyl))$_{24}$-Trp$_{25}$-Leu$_{26}$-Leu$_{27}$-Gln$_{28}$-Thr$_{29}$-NH$_2$;

(SEQ ID NO: 14)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(13-carboxyl-tridecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 15)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(15-carboxyl-pentadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

(SEQ ID NO: 16)
His$_1$-Aib$_2$-Gln$_3$-Gly$_4$-Thr$_5$-Phe$_6$-Thr$_7$-Ser$_8$-Asp$_9$-Glu$_{10}$-Ser$_{11}$-Lys$_{12}$-Tyr$_{13}$-Lys$_{14}$-Asp$_{15}$-Ser$_{16}$-Lys(N-omega(1-(17-carboxyl-heptadecyloxy)beta-D-glucuronyl))$_{17}$-Ala$_{18}$-Ala$_{19}$-Gln$_{20}$-Glu$_{21}$-Phe$_{22}$-Ile$_{23}$-Gln$_{24}$-Trp$_{25}$-Leu$_{26}$-Leu$_{27}$-Gln$_{28}$-Thr$_{29}$-NH$_2$;

```
                                                                          (SEQ ID NO: 17)
His₁-Aib₂-Gln₃-Gly₄-Thr₅-Phe₆-Thr₇-Ser₈-Asp₉-Glu₁₀-Ser₁₁-Lys₁₂-Tyr₁₃-Lys₁₄-Asp₁₅-Ser₁₆-Gln₁₇-
Ala₁₈-Ala₁₉-Gln₂₀-Glu₂₁-Phe₂₂-Ile₂₃-Lys(N-omega(1-(13-carboxyl-tridecyloxy)beta-D-
glucuronyl))₂₄-Trp₂₅-Leu₂₆-Leu₂₇-Gln₂₈-Thr₂₉-NH₂;

(SEQ ID NO: 18)
His₁-Aib₂-Gln₃-Gly₄-Thr₅-Phe₆-Thr₇-Sers-Asp₉-Glu₁₀-Ser₁₁-Lys₁₂-Tyr₁₃-Lys₁₄-Asp₁₅-Ser₁₆-Gln₁₇-
Ala₁₈-Ala₁₉-Gln₂₀-Glu₂₁-Phe₂₂-Ile₂₃-Lys(N-omega(1-(15-carboxyl-pentadecyloxy)beta-D-
glucuronyl))₂₄-Trp₂₅-Leu₂₆-Leu₂₇-Gln₂₈-Thr₂₉-NH₂;

(SEQ ID NO: 19)
His₁-Aib₂-Gln₃-Gly₄-Thr₅-Phe₆-Thr₇-Sers-Asp₉-Glu₁₀-Ser₁₁-Lys₁₂-Tyr₁₃-Lys₁₄-Asp₁₅-Ser₁₆-Gln₁₇-
Ala₁₈-Ala₁₉-Gln₂₀-Glu₂₁-Phe₂₂-Ile₂₃-Lys(N-omega(1-(17-carboxyl-heptadecyloxy)beta-D-
glucuronyl))₂₄-Trp₂₅-Leu₂₆-Leu₂₇-Gln₂₈-Thr₂₉-NH₂;

(SEQ ID NO: 20)
His₁-Aib₂-Gln₃-Gly₄-Thr₅-Phe₆-Thr₇-Ser₈-Asp₉-Tyr₁₀-Ser₁₁-Lys₁₂-Tyr₁₃-Leu₁₄-Asp₁₅-Glu₁₆-
Lys₁₇-Ala₁₈-Ala₁₉-Lys₂₀-Glu₂₁-Phe₂₂-Ile₂₃-Lys₂₄-Trp₂₅-Leu₂₆-Leu₂₇-Gln₂₈-Thr₂₉-NH₂;

(SEQ ID NO: 21)
His₁-Aib₂-Gln₃-Gly₄-Thr₅-Phe₆-Thr₇-Ser₈-Asp₉-Tyr₁₀-Ser₁₁-Lys₁₂-Tyr₁₃-Leu₁₄-Asp₁₅-Glu₁₆-
Gln₁₇-Ala₁₈-Ala₁₉-Lys₂₀-Glu₂₁-Phe₂₂-Ile₂₃-Lys₂₄-Trp₂₅-Leu₂₆-Leu₂₇-Gln₂₈-Thr₂₉-NH₂;

(SEQ ID NO: 22)
His₁-Aib₂-Gln₃-Gly₄-Thr₅-Phe₆-Thr₇-Ser₈-Asp₉-Glu₁₀-Ser₁₁-Lys₁₂-Tyr₁₃-Lys₁₄-Asp₁₅-Ser₁₆-Lys₁₇-
Ala₁₈-Ala₁₉-Gln₂₀-Glu₂₁-Phe₂₂-Ile₂₃-Gln₂₄-Trp₂₅-Leu₂₆-Leu₂₇-Gln₂₈-Thr₂₉-NH₂; or (SEQ ID NO: 23)
His₁-Aib₂-Gln₃-Gly₄-Thr₅-Phe₆-Thr₇-Sers-Asp₉-Glu₁₀-Ser₁₁-Lys₁₂-Tyr₁₃-Lys₁₄-Asp₁₅-Ser₁₆-Gln₁₇-
Ala₁₈-Ala₁₉-Gln₂₀-Glu₂₁-Phe₂₂-Ile₂₃-Lys₂₄-Trp₂₅-Leu₂₆-Leu₂₇-Gln₂₈-Thr₂₉-NH₂;
``` and
a pharmaceutically acceptable carrier or excipient.

2. The pharmaceutical composition of claim 1, wherein in (i): $R^1$ is a linear alkyl group comprising 7 carbon atoms; or $R^1$ is an alkyl comprising 7 to 17 carbon atoms and a carboxyl group, wherein the carboxyl group is a carboxyl group of a carboxylic acid, acid anhydride, or ester; or $R^1$ is an alkyl comprising 7 to 17 carbon atoms and a carboxyl group, wherein the carboxyl group is a terminal carboxyl group.

3. The pharmaceutical composition of claim 1, wherein $R^3$ is hydrogen or an alkali metal cation, wherein the alkali metal cation is a lithium, sodium, or potassium cation.

4. The pharmaceutical composition of claim 1, wherein in (i), the compound comprises NaGly(N-Bn)C8 having the structure:

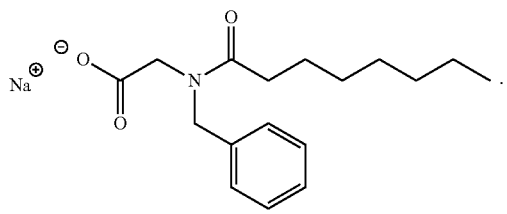 [SMILES: [Na+] ; CCCCCCCC(=O)N(CC(=O)[O-])Cc1ccccc1]

5. The pharmaceutical composition of claim 1, wherein the compound of (ii) comprises pemvidutide.

6. The pharmaceutical composition of claim 1, wherein the compound of (ii) has at least 90% sequence identity to SEQ ID NO: 1 or SEQ ID NO: 2; or
the compound has at least 95% sequence identity to SEQ ID NO: 1 or SEQ ID NO: 2; or
the compound has at least 99% sequence identity to SEQ ID NO: 1 or SEQ ID NO: 2.

7. The pharmaceutical composition of claim 1, comprising about 0.5 to about 20 wt % of the compound of (ii).

8. The pharmaceutical composition of claim 1, comprising at least 300 mg/g of the compound of (i) relative to the total weight of the composition; or the weight ratio of the compound of (i) to the compound of (ii) is from about 1:1 to about 200:1.

9. The pharmaceutical composition of claim 1, comprising an excipient, wherein the excipient comprises a lubricant, surfactant, pH modifier, disintegrant, binders, filler, glidant, diluent, polymer for sustained or delayed release, or a preservative.

10. The pharmaceutical composition of claim 9, wherein the pH modifier comprises sodium carbonate, phosphates, citrates, citric acid, tartarate or tartaric acid; or the lubricant comprises magnesium stearate or glyceryl dibehenate; or
the disintegrant comprises croscarmellose.

11. The pharmaceutical composition of claim 9, comprising at most 15% w/w of the pH modifier; or
comprising less than 5% w/w of the lubricant; or
comprising about 0.25 and about 2.5% w/w of the disintegrant.

12. The pharmaceutical composition of claim 1, further comprising a serine protease inhibitor or a permeation enhancer.

13. The pharmaceutical composition of claim 12, wherein the serine protease inhibitor comprises soybean tripsin inhibitor (SBTI); or the permeation enhancer comprises sodium salcaprozate.

14. The pharmaceutical composition of claim 12, comprising 100 to 400 mg/g of the serine protease inhibitor; or comprising at least 300 mg/g of the permeation enhancer.

15. The pharmaceutical composition of claim 4, wherein the compound of (ii) comprises pemvidutide, and the composition further comprises sodium carbonate, and SBTI.

16. The pharmaceutical composition of claim 1, wherein the pharmaceutical composition is an oral composition.

17. The pharmaceutical composition of claim 1, wherein the pharmaceutical composition is a solid composition.

18. The pharmaceutical composition of claim 17, wherein the solid composition is a unitary solid dosage.

19. The pharmaceutical composition of claim 4, wherein the pharmaceutical composition comprises a solid composition in a unitary solid dosage, and the compound of (ii) comprises pemvidutide.

20. The pharmaceutical composition of claim 18, wherein the unitary solid dosage is in the form of capsules, tablets, dragees, pills, lozenges, powders, or granules.

21. A method of treating obesity, type II diabetes, or non alcoholic steatohepatitis comprising administering to a subject, the pharmaceutical composition of claim 1.

22. The method of claim 21, wherein the administering step comprises orally administering the pharmaceutical composition.

23. The method of claim 22, comprising orally administering to the subject the pharmaceutical composition comprising pemvidutide and NaGly(N-Bn)C8.

24. The method of claim 23, wherein the pharmaceutical composition adminstered orally further comprises SBTI.

25. The method of claim 21, wherein the administering step occurs once daily; or
the administering step occurs twice daily; or
the administering step occurs weekly; or
the administering step occurs monthly.

26. The pharmaceutical composition of claim 4, wherein the compound of (ii) comprises pemvidutide.

27. The pharmaceutical composition of claim 4, wherein the compound of (ii) has at least 90% sequence identity to SEQ ID NO: 1 or SEQ ID NO: 2; or
the compound has at least 95% sequence identity to SEQ ID NO: 1 or SEQ ID NO: 2; or
the compound has at least 99% sequence identity to SEQ ID NO: 1 or SEQ ID NO: 2.

28. The pharmaceutical composition of claim 26, comprising about 0.5 to about 20 wt % of the compound of (ii); or, comprising at least 300 mg/g of the compound of (i) relative to the total weight of the composition; or wherein the weight ratio of the compound of (i) to the compound of (ii) is from about 1:1 to about 200:1.

29. The pharmaceutical composition of claim 26, comprising an excipient, wherein the excipient comprises a lubricant, surfactant, pH modifier, disintegrant, binders, filler, glidant, diluent, polymer for sustained or delayed release, or a preservative; or, wherein the excipient comprises a pH modifier that comprises sodium carbonate, phosphates, citrates, citric acid, tartarate or tartaric acid; or the excipient comprises a lubricant that comprises magnesium stearate or glyceryl dibehenate; or the excipient comprises a disintegrant that comprises croscarmellose; or, the excipient comprises a pH modifier and the pharmaceutical composition comprises at most 15% w/w of the pH modifier; or the excipient comprises a lubricant and the pharmaceutical composition comprises less than 5% w/w of the lubricant; or the excipient comprises a disintegrant and the pharmaceutical composition comprises about 0.25 and about 2.5% w/w of the disintegrant.

30. The pharmaceutical composition of claim 26, further comprising a serine protease inhibitor or a permeation enhancer.

* * * * *

```
                          SEQUENCE LISTING

Sequence total quantity: 24
SEQ ID NO: 1            moltype = AA  length = 29
FEATURE                 Location/Qualifiers
source                  1..29
                        mol_type = protein
                        organism = synthetic construct
MOD_RES                 2
                        note = Aib
MOD_RES                 17
                        note =
                        K(N-omega(1-(17-carboxyl-heptadecyloxy)beta-D-glucuronyl))
SEQUENCE: 1
HXQGTFTSDY SKYLDEKAAK EFIQWLLQT                                           29

SEQ ID NO: 2            moltype = AA  length = 29
FEATURE                 Location/Qualifiers
source                  1..29
                        mol_type = protein
                        organism = synthetic construct
MOD_RES                 2
                        note = Aib
SEQUENCE: 2
HXQGTFTSDY SKYLDEKAAK EFIQWLLQT                                           29

SEQ ID NO: 3            moltype = AA  length = 29
FEATURE                 Location/Qualifiers
source                  1..29
                        mol_type = protein
                        organism = synthetic construct
MOD_RES                 2
                        note = Aib
MOD_RES                 17
                        note = K(N-omega(1-tetradecyl alpha-D-melibiouronyl))
SEQUENCE: 3
HXQGTFTSDY SKYLDEKAAK EFIQWLLQT                                           29

SEQ ID NO: 4            moltype = AA  length = 29
FEATURE                 Location/Qualifiers
source                  1..29
                        mol_type = protein
                        organism = synthetic construct
MOD_RES                 2
                        note = Aib
MOD_RES                 17
                        note = K(N-omega(1-hexadecyl alpha-D-melibiouronyl))
SEQUENCE: 4
HXQGTFTSDY SKYLDEKAAK EFIQWLLQT                                           29

SEQ ID NO: 5            moltype = AA  length = 29
FEATURE                 Location/Qualifiers
source                  1..29
                        mol_type = protein
                        organism = synthetic construct
MOD_RES                 2
                        note = Aib
MOD_RES                 17
                        note = K(N-omega(1-octadecyl alpha-D-melibiouronyl))
SEQUENCE: 5
HXQGTFTSDY SKYLDEKAAK EFIQWLLQT                                           29

SEQ ID NO: 6            moltype = AA  length = 29
FEATURE                 Location/Qualifiers
source                  1..29
                        mol_type = protein
                        organism = synthetic construct
MOD_RES                 2
                        note = Aib
MOD_RES                 17
                        note = K(N-omega(1-dodecyl alpha-D-melibiouronyl))
MOD_RES                 24
                        note = K(N-omega(1-dodecyl beta-D-glucuronyl))
SEQUENCE: 6
HXQGTFTSDY SKYLDEKAAK EFIKWLLQT                                           29
```

```
SEQ ID NO: 7              moltype = AA  length = 29
FEATURE                   Location/Qualifiers
source                    1..29
                          mol_type = protein
                          organism = synthetic construct
MOD_RES                   2
                          note = Aib
MOD_RES                   17
                          note = K(N-omega(1-tetradecyl alpha-D-melibiouronyl))
MOD_RES                   24
                          note = K(N-omega(1-tetradecyl beta-D-glucouronyl))
SEQUENCE: 7
HXQGTFTSDY SKYLDEKAAK EFIKWLLQT                                            29

SEQ ID NO: 8              moltype = AA  length = 29
FEATURE                   Location/Qualifiers
source                    1..29
                          mol_type = protein
                          organism = synthetic construct
MOD_RES                   2
                          note = Aib
MOD_RES                   17
                          note = K(N-omega(1-hexadecyl alpha-D-melibiouronyl))
MOD_RES                   24
                          note = K(N-omega(1-hexadecyl beta-D-glucouronyl))
SEQUENCE: 8
HXQGTFTSDY SKYLDEKAAK EFIKWLLQT                                            29

SEQ ID NO: 9              moltype = AA  length = 29
FEATURE                   Location/Qualifiers
source                    1..29
                          mol_type = protein
                          organism = synthetic construct
MOD_RES                   2
                          note = Aib
MOD_RES                   17
                          note =
                          K(N-omega(1-(13-carboxyl-tridecyloxy)beta-D-glucuronyl))
SEQUENCE: 9
HXQGTFTSDY SKYLDEKAAK EFIQWLLQT                                            29

SEQ ID NO: 10             moltype = AA  length = 29
FEATURE                   Location/Qualifiers
source                    1..29
                          mol_type = protein
                          organism = synthetic construct
MOD_RES                   2
                          note = Aib
MOD_RES                   17
                          note =
                          K(N-omega(1-(15-carboxyl-pentadecyloxy)beta-D-glucuronyl))
SEQUENCE: 10
HXQGTFTSDY SKYLDEKAAK EFIQWLLQT                                            29

SEQ ID NO: 11             moltype = AA  length = 29
FEATURE                   Location/Qualifiers
source                    1..29
                          mol_type = protein
                          organism = synthetic construct
MOD_RES                   2
                          note = Aib
MOD_RES                   24
                          note =
                          K(N-omega(1-(13-carboxyl-tridecyloxy)beta-D-glucuronyl))
SEQUENCE: 11
HXQGTFTSDY SKYLDEQAAK EFIKWLLQT                                            29

SEQ ID NO: 12             moltype = AA  length = 29
FEATURE                   Location/Qualifiers
source                    1..29
                          mol_type = protein
                          organism = synthetic construct
MOD_RES                   2
                          note = Aib
MOD_RES                   24
                          note =
                          K(N-omega(1-(15-carboxyl-pentadecyloxy)beta-D-glucuronyl))
```

```
SEQUENCE: 12
HXQGTFTSDY SKYLDEQAAK EFIKWLLQT                                    29

SEQ ID NO: 13           moltype = AA   length = 29
FEATURE                 Location/Qualifiers
source                  1..29
                        mol_type = protein
                        organism = synthetic construct
MOD_RES                 2
                        note = Aib
MOD_RES                 24
                        note =
                        K(N-omega(1-(17-carboxyl-pentadecyloxy)beta-D-glucuronyl))
SEQUENCE: 13
HXQGTFTSDY SKYLDEQAAK EFIKWLLQT                                    29

SEQ ID NO: 14           moltype = AA   length = 29
FEATURE                 Location/Qualifiers
source                  1..29
                        mol_type = protein
                        organism = synthetic construct
MOD_RES                 2
                        note = Aib
MOD_RES                 17
                        note =
                        K(N-omega(1-(13-carboxyl-tridecyloxy)beta-D-glucuronyl))
SEQUENCE: 14
HXQGTFTSDE SKYKDSKAAQ EFIQWLLQT                                    29

SEQ ID NO: 15           moltype = AA   length = 29
FEATURE                 Location/Qualifiers
source                  1..29
                        mol_type = protein
                        organism = synthetic construct
MOD_RES                 2
                        note = Aib
MOD_RES                 17
                        note =
                        K(N-omega(1-(15-carboxyl-pentadecyloxy)beta-D-glucuronyl))
SEQUENCE: 15
HXQGTFTSDE SKYKDSKAAQ EFIQWLLQT                                    29

SEQ ID NO: 16           moltype = AA   length = 29
FEATURE                 Location/Qualifiers
source                  1..29
                        mol_type = protein
                        organism = synthetic construct
MOD_RES                 2
                        note = Aib
MOD_RES                 17
                        note =
                        K(N-omega(1-(17-carboxyl-heptadecyloxy)beta-D-glucuronyl))
SEQUENCE: 16
HXQGTFTSDE SKYKDSKAAQ EFIQWLLQT                                    29

SEQ ID NO: 17           moltype = AA   length = 29
FEATURE                 Location/Qualifiers
source                  1..29
                        mol_type = protein
                        organism = synthetic construct
MOD_RES                 2
                        note = Aib
MOD_RES                 24
                        note =
                        K(N-omega(1-(13-carboxyl-tridecyloxy)beta-D-glucuronyl))
SEQUENCE: 17
HXQGTFTSDE SKYKDSQAAQ EFIKWLLQT                                    29

SEQ ID NO: 18           moltype = AA   length = 29
FEATURE                 Location/Qualifiers
source                  1..29
                        mol_type = protein
                        organism = synthetic construct
MOD_RES                 2
                        note = Aib
MOD_RES                 24
                        note =
                        K(N-omega(1-(15-carboxyl-pentadecyloxy)beta-D-glucuronyl))
```

```
SEQUENCE: 18
HXQGTFTSDE SKYKDSQAAQ EFIKWLLQT                                    29

SEQ ID NO: 19           moltype = AA   length = 29
FEATURE                 Location/Qualifiers
source                  1..29
                        mol_type = protein
                        organism = synthetic construct
MOD_RES                 2
                        note = Aib
MOD_RES                 24
                        note =
                        K(N-omega(1-(17-carboxyl-heptadecyloxy)beta-D-glucuronyl))
SEQUENCE: 19
HXQGTFTSDE SKYKDSQAAQ EFIKWLLQT                                    29

SEQ ID NO: 20           moltype = AA   length = 29
FEATURE                 Location/Qualifiers
source                  1..29
                        mol_type = protein
                        organism = synthetic construct
MOD_RES                 2
                        note = Aib
SEQUENCE: 20
HXQGTFTSDY SKYLDEKAAK EFIKWLLQT                                    29

SEQ ID NO: 21           moltype = AA   length = 29
FEATURE                 Location/Qualifiers
source                  1..29
                        mol_type = protein
                        organism = synthetic construct
MOD_RES                 2
                        note = Aib
SEQUENCE: 21
HXQGTFTSDY SKYLDEQAAK EFIKWLLQT                                    29

SEQ ID NO: 22           moltype = AA   length = 29
FEATURE                 Location/Qualifiers
source                  1..29
                        mol_type = protein
                        organism = synthetic construct
MOD_RES                 2
                        note = Aib
SEQUENCE: 22
HXQGTFTSDE SKYKDSKAAQ EFIQWLLQT                                    29

SEQ ID NO: 23           moltype = AA   length = 29
FEATURE                 Location/Qualifiers
source                  1..29
                        mol_type = protein
                        organism = synthetic construct
MOD_RES                 2
                        note = Aib
SEQUENCE: 23
HXQGTFTSDE SKYKDSQAAQ EFIKWLLQT                                    29

SEQ ID NO: 24           moltype = AA   length = 29
FEATURE                 Location/Qualifiers
source                  1..29
                        mol_type = protein
                        organism = synthetic construct
MOD_RES                 2
                        note = Aib
SEQUENCE: 24
HXQGTFTSDY SKYLDEKAAK EFIQWLLQT                                    29
```